(12) United States Patent
Aita et al.

(10) Patent No.: US 11,478,717 B2
(45) Date of Patent: Oct. 25, 2022

(54) GAME SYSTEM AND METHOD OF PROVIDING INFORMATION RELATED TO MATCH-UP GAME

(71) Applicant: BANDAI NAMCO Entertainment Inc., Tokyo (JP)

(72) Inventors: Sho Aita, Tokyo (JP); Yuki Mizuhori, Tokyo (JP); Atsushi Nakano, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 168 days.

(21) Appl. No.: 16/820,803

(22) Filed: Mar. 17, 2020

(65) Prior Publication Data

US 2020/0306649 A1 Oct. 1, 2020

(30) Foreign Application Priority Data

Mar. 28, 2019 (JP) .............................. JP2019-063141

(51) Int. Cl.
*A63F 13/837* (2014.01)
*A63F 13/44* (2014.01)
*A63F 13/58* (2014.01)
*A63F 13/798* (2014.01)

(52) U.S. Cl.
CPC ............ *A63F 13/837* (2014.09); *A63F 13/44* (2014.09); *A63F 13/58* (2014.09); *A63F 13/798* (2014.09); *A63F 2300/5566* (2013.01); *A63F 2300/638* (2013.01); *A63F 2300/8076* (2013.01)

(58) Field of Classification Search
CPC ........ A63F 13/837; A63F 13/44; A63F 13/58; A63F 13/798; A63F 2300/5566; A63F 2300/638; A63F 2300/8076
See application file for complete search history.

(56) References Cited

U.S. PATENT DOCUMENTS

2006/0261557 A1\* 11/2006 Hyra ......................... A63F 3/00
273/288
2007/0111789 A1\* 5/2007 van Deursen ........... A63F 13/12
463/40

OTHER PUBLICATIONS

Official site of Playerunknown's Battlegrounds. URL: http://pubg.dmm.com/about (and English machine translation).
Official site of Playerunknown's Battlegrounds. Retrieved on Sep. 19, 2018. URL: http://pubg.dmm.com/about (and English machine translation) (Discussed on p. 2 of the specification).

\* cited by examiner

*Primary Examiner* — Thomas H Henry
(74) *Attorney, Agent, or Firm* — Posz Law Group, PLC

(57) ABSTRACT

A game system that is a server or the like is configured to repetitively determine, during a match-up game, for each set determination period, participation continuation in the match-up game with respect to each player character according to a determination criterion which is based on acquisition of a specific item set in advance, and when it is determined that the player character does not satisfy the determination criterion at an end timing or before the end timing of the determination period, execute participation-limiting processing for limiting participation by the player character concerned in the match-up game such as loss management that involves causing the player character to suffer a loss from the match-up game in which the player character is participating.

20 Claims, 9 Drawing Sheets

GAME SYSTEM AND METHOD OF PROVIDING INFORMATION RELATED TO MATCH-UP GAME

Japanese Patent Application No. 2019-063141, filed on Mar. 28, 2019, is hereby incorporated by reference in its entirety.

BACKGROUND OF THE INVENTION

The present invention relates to a game system, a method of providing information related to a match-up game, and the like.

Conventionally, action games and shooting games are known, including third-person shooting (TPS) games (third-person shooters) which enable a player to move freely inside a game world or a game space in a game or the like from a third-person perspective of following a player character and fight using a weapon or fight in hand-to-hand combat and first-person shooting (FPS) games (first-person shooters) which enable a player to move freely inside a game world or a game space in a game or the like from a perspective of a player character and fight using a weapon or fight in hand-to-hand combat.

In addition, among such games, there are also known battle royale games or roll playing games (MMORPGs: Massively Multiplayer Online Role-Playing Games) in which a plurality of players or teams participate in a game world of a single game and whichever player or team has managed to continue the game the longest is recognized as a winner.

In particular, game systems that execute such games are configured so as to execute a match-up between players for survival by managing a parameter such as a stamina level or life energy that enable each player or each player character to continue to participate in the game (in other words, a parameter that enables each player or each player character to survive in the game) and judging that a player or player character loses when a predetermined condition such as the parameter dropping to "0" is satisfied (for example, official site of PLAYERUNKNOWN'S BATTLEGROUNDS [retrieved Sep. 19, 2018], URL: http://pubg.dmm.com/about).

However, with the game system described on the official site of PLAYERUNKNOWN'S BATTLEGROUNDS or the like, in order to continuously participate in the game, a parameter which is necessary for surviving the game such as a stamina level or life energy need only be kept at high values and a strategy of avoiding match-ups rather than engaging in match-ups with other players can be adopted. Therefore, when such a strategy is adopted by a large number of players in a game system such as that described above, opportunities for match-ups between players or player characters in large numbers cannot be created and the game cannot be invigorated.

SUMMARY

The invention can provide a game system and the like which are capable of creating opportunities for match-ups, invigorating a match-up game, and improving an entertainment level of the match-up game by providing a new condition for continuously participating in the match-up game.

According to a first aspect of the invention, there is provided a game system which executes a match-up game among a plurality of players using player characters set in a game space and which provides a terminal with information related to the match-up game, the game system including a processor programmed to:

execute control processing related to a match-up that uses the player characters among the plurality of players;

manage a specific item that can be acquired by the player characters during the match-up game;

execute determination processing for repetitively determining whether or not each of the player characters satisfies a determination criterion related to the specific item in each given period during the match-up game;

when the processor has executed the determination processing and determined that a player character among the player characters does not satisfy the determination criterion at an end timing of the given period, execute participation-limiting processing for limiting participation in the match-up game by the player character; and change a prerequisite related to the specific item in the determination processing to be disadvantageous to the player characters or change the determination criterion to be disadvantageous to the player characters as compared to a determination criterion in previous determination processing every time the end timing arrives.

According to a second aspect of the invention, there is provided a method of executing a match-up game among a plurality of players using player characters set in a game space and providing a terminal with information related to the match-up game, the method of providing information related to a match-up game including:

executing control processing related to a match-up that uses the player characters among the plurality of players;

managing a specific item that can be acquired by the player characters during the match-up game;

executing determination processing for repetitively determining whether or not each of the player characters satisfies a determination criterion related to the specific item in each given period during the match-up game;

when the processor has executed the determination processing and determined that a player character among the player characters does not satisfy the determination criterion at an end timing of the given period, executing participation-limiting processing for limiting participation in the match-up game by the player character; and changing a prerequisite related to the specific item in the determination processing to be disadvantageous to the player characters or changing the determination criterion to be disadvantageous to the player characters as compared to a determination criterion in previous determination processing every time the end timing arrives.

Figure 1:
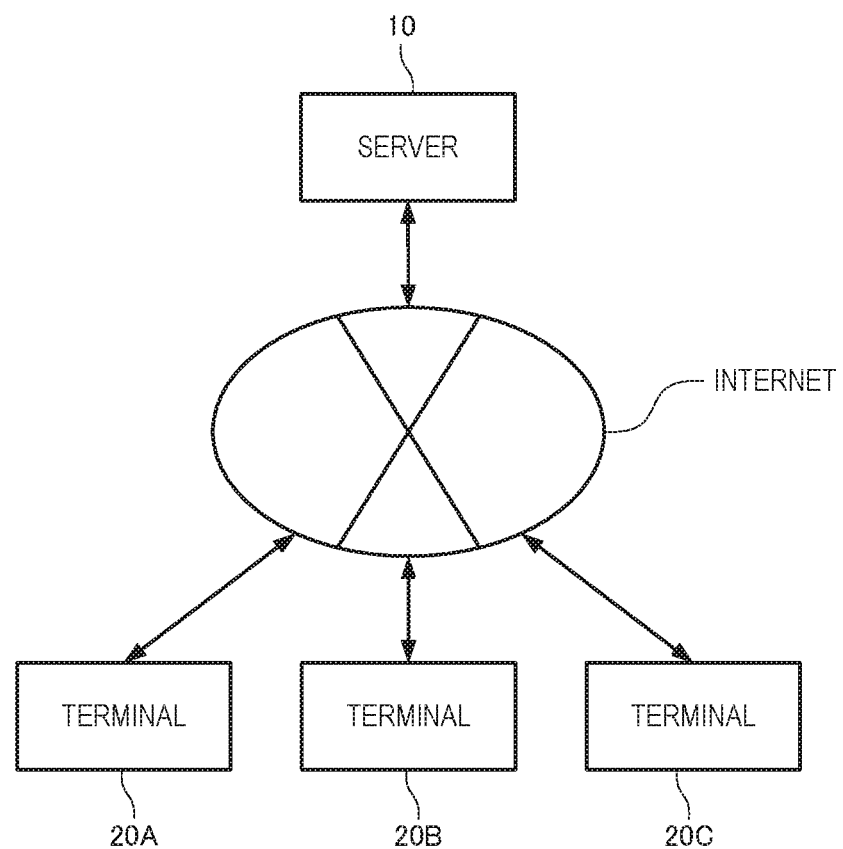
FIG. 1 is a diagram illustrating an example of a system configuration representing a configuration of a game system according to an embodiment of the invention.

DETAILED DESCRIPTION OF THE EMBODIMENT (1) According to an embodiment of the invention, there is provided a game system which executes a match-up game among a plurality of players using player characters set in a game space and which provides a terminal with information related to the match-up game, the game system including a processor programmed to:

execute control processing related to the match-up that uses the player characters among the plurality of players:

manage a specific item that is acquired by the player characters during the match-up game:

execute determination processing for repetitively determining whether or not each of the player characters satisfies a determination criterion related to the specific item in each given period during the match-up game:

when the processor has executed the determination processing and determined that a player character among the player characters does not satisfy the determination criterion at an end timing of the given period, execute participation-limiting processing for limiting participation in the match-up game by the player character; and change a prerequisite related to the specific item in the determination processing to be disadvantageous to the player character or change the determination criterion to be disadvantageous to the player character as compared to a determination criterion in previous determination processing every time the end timing arrives.

Since the game system described above is capable of providing new conditions for continuously participating in a match-up game other than, for example, a value of a parameter which is necessary for surviving the match-up game such as a stamina level or life energy, opportunities of an occurrence of predetermined actions such as movement and match-ups with other player characters during the match-up game including acquisition of a specific item and competition to win the specific item among player characters can be newly provided and, accordingly, opportunities of match-ups can be created.

Therefore, since the game system described above is capable of inevitably creating a large number of match-ups, the game can be invigorated and an entertainment level of the game can be improved.

In particular, according to the game system described above, for example, since it becomes more difficult to take actions to avoid match-ups by adopting a strategy of hiding from other players or staying still even when loss management is performed based on a parameter which is necessary for surviving the match-up game such as those described above, opportunities of match-ups can be created and, consequently, the game can be invigorated.

It should be noted that match-up games include a battle game in which a battle or hand-to-hand combat with an enemy character or another player character is performed, an action game, an RPG, a sound game, and a sport game which involve inter-individual match-ups or inter-group match-ups.

Moreover, being "set in a game space" includes, for example, being set in a game field formed in a virtual space such as a three-dimensional space or a two-dimensional space.

In addition, for example, the "specific item" includes items solely used for determination processing, items to be used by player characters during match-ups such as weapons and tools, and items to be consumed during the match-up game such as food.

In particular, the "specific item" is:

(A1) randomly arranged over an entire region in a game space or randomly arranged in a region which is formed in the game space and which is outside a penalty area (in other words, an area in which activity is recommended) in which a disadvantage to a player character is enjoyed as long as the player character is present in the region; or (A2) arranged in a predetermined region positioned inside the game space to be acquired and possessed by each player character.

In addition, for example, when the "specific item" is arranged in the game space, specific performance processing (for example, an arrangement position emitting light) in order to have the position where the "specific item" is arranged be recognized by each player, or when acquired by and possessed by a player character, processing for moving the "specific item" inside a game space in accordance with a movement of the player character and processing for making one aware at a predetermined timing that the "specific item" is possessed by another player may be executed.

For example, when the "specific item" is arranged at a fixed spot in the game space, a constraint such as not awarding the specific item unless another item such as a key (preferably, randomly arranged in the game space) is present.

In other words, the "specific item" may be:

(B1) arranged using an object such as a barrier or an interior of a locked warehouse such that the specific item cannot be acquired unless a player character destroys or unlocks the object; or (B2) set based on a position or the like where the specific item is arranged such that the specific item cannot be acquired unless a task is completed.

For example, "acquisition" of a specific item includes the following:

(C1) collecting the specific item that had been arranged;

(C2) winning a match-up with a specific character such as an NPC who had previously possessed the specific item;

(C3) exploiting another player character who is in possession of the specific item when predetermined conditions (for example, when present for 3 seconds within 1 m behind the player character or when an exploitation item is used) are satisfied; and (C4) being transferred from a player character of a same team.

Furthermore, the "determination criteria" include: acquisition of one or more specific items; acquisition of a plurality of specific items (a plurality of items of a same type or a combination of items of different types); and use of an acquired specific item (other conditions may be included when using the specific item such as use in a predetermined state of a player character such as an invincible state, use in a predetermined area or a predetermined stage, use during a predetermined event period, or use in combination with another item).

In particular, when determining whether or not a plurality of specific items have been acquired, in order to maintain participation by many player characters and invigorate the game, the number of acquisitions of the specific items that can be acquired by one player character is preferably limited. In this case, an upper limit number of the specific items which each player character can possess (in other words, an upper limit number in possession) may be changed during a match-up game.

Furthermore, the "determination criteria" need not be the same in each determination processing and may differ from one type of determination processing to the next.

In addition to the above, "for each given period" may mean for each certain period (for example, 10 minutes) determined in advance or each period from determination processing to determination processing may be irregular (the period need not always be the certain period).

For example, cases where each given period is irregular include the following:

(D1) in a case of a battle royale-type survival game, at each timing determined based on the number or a stamina level (an average value, ½ of a maximum value and a minimum value, or the like) of surviving player characters;

(D2) in a case where a map contracts as a game progresses, at each timing determined based on a size of a game field;

(D3) at each timing determined based on a level of each player character or each player or a difference between such levels;

(D4) at each timing determined based on types (configurations) of player characters engaged in a match-up or the like; and (D5) when the number of player characters having achieved a quota reaches a predetermined number.

Cases where each given period is irregular may be a combination of (D1) to (D5).

In addition, a definition of "acquisition" includes meanings of both a case where the specific item had been previously acquired but presently not in possession and a case where the specific item is in possession at a timing of determination processing. However, in the game system described above, the definition of "acquisition" preferably means that the specific item is in possession at the timing of determination processing.

For example, the "determination processing" may be executed collectively with respect to all player characters participating in a match-up game every time the end timing of a given period arrives or may be individually repetitively executed for each player character during the given period. When the "determination processing" is to be repetitively executed and determination criteria are satisfied until the end timing of the given period, upon execution of the determination processing, a limit will not be imposed on participation in the match-up game at that time point until a next given period starts.

In addition, examples of the "participation-limiting processing for limiting participation in the match-up game" include the following:

(E1) suspending participation in the match-up game subsequent to the determination processing concerned (in other words, game over);

(E2) temporarily banning participation in the match-up game subsequent to the determination processing concerned (in other words, interruption); and (E3) imposing a penalty such as making a predetermined item unacquirable, resetting a value of a predetermined parameter (such as an experience point, a stamina level, or the like), or forcibly setting the predetermined parameter to a disadvantageous value.

In addition, the "prerequisite" includes the total number of specific items to be arranged in a game space to be acquired by player characters, arrangement positions of the specific items in the game space, and acquisition conditions of the items (conditions such as a presence or absence of another item, attainment of a task, or a capability value of a player character desiring to acquire the specific item).

For example, "change a prerequisite related to the specific item in the determination processing to be disadvantageous to the player character" includes reducing the number of items that can be acquired by the player character.

Furthermore, "change the determination criteria to be disadvantageous to the player character as compared to determination criteria in previous determination processing" includes making the determination criteria stricter (in other words, increasing a quota) in accordance with a game status such as reducing the number of the specific items that can be possessed or increasing the number of the specific items that must be acquired as the game progresses.

In particular, when the determination criteria are a predetermined number of acquisitions of the specific items, "reducing the number of items" may involve reducing one or more of the specific items every time the end timing of a determination period arrives.

In addition, in this case, in a given period immediately after the predetermined determination processing, the specific items may not be reduced and a same number of the specific items may be maintained. However, even in such a case where a same number is maintained, when the number of the specific items has been reduced from the number upon a previous execution of the determination processing after a plurality of executions of the determination processing or when the specific items are arranged in a game space including a penalty area where a penalty is imposed to player characters present, it is essential that the number of specific items arranged inside the penalty area be larger than the number of specific items upon a previous execution of the determination processing.

(2) In the game system described above, the processor may be programmed to:

when the determination processing is executed to determine whether or not each of the player characters acquires the specific item, set the number of specific items that can be acquired by each of the player characters to be smaller than the number of the player characters continuously participating in the match-up game among the player characters, every time the end timing arrives, and control arrangement of the specific item in the game space based on the set number of specific items.

According to the game system described above, since a player character unable to acquire the specific item until a next determination period ends is inevitably present when executing the determination processing for determining whether or not the specific item is acquired by a player character, a player character that loses can be inevitably created every time a determination period ends.

Therefore, since a competition to win a specific number of the specific items among player characters can be realized, opportunities of movement and an occurrence of a predetermined action during a match-up game can be provided and, accordingly, opportunities of match-ups can be created.

It should be noted that "set the number of items . . . smaller than the number of the player characters" may involve, for example, reducing the number of items by one or a plurality every time the end timing arrives. In addition, the number of items to be reduced may be determined every time the end timing arrives including reducing the number of items by different numbers such as by "1" for a first time and by "2" for a second time.

(3) In the game system described above, the processor may be programmed to, when the processor has suspended participation by the player character among the player characters possessing the specific item in the match-up game, arrange the specific item in the game space in order to be acquirable by other player character among the player characters.

According to the game system described above, an opportunity for a competition to win the specific item can be created by having a player character not yet possessing the specific item (including player characters not possessing all specific items (in other words, player characters not having achieved a quota) when possession of a plurality of specific items is required at the time of determination processing) engage in a match-up with a player character possessing the specific item.

Therefore, the game system described above is capable of providing opportunities of movement and an occurrence of a predetermined action during a match-up game and, accordingly, creating opportunities of match-ups.

It should be noted that examples of "participation . . . in the match-up game is suspended" include cases where a game can no longer be continued such as a case where a parameter which is necessary for surviving the match-up game such as a stamina level or life energy drops to "0" (when suffering a loss), a case where the match-up game is executed via communication and a communication line is cut off, and a case where a player voluntarily cancels participation in the match-up game.

In addition, examples of "arrange . . . in the game space" include being left unattended at a position in the game space where participation by a player character possessing the specific item is prohibited and arranging at a specific position in the game space.

(4) In the game system described above, the processor may be programmed to:

change a possessed state of a player character among the player characters possessing the specific item from the possessed state to an unpossessed state where the player character does not possess the specific item, every time the determination processing is executed; and rearrange the specific item in the possession of the player character during the possessed state in the game space in order to be acquirable by the player characters.

According to the game system described above, since a possessed state of the specific item can be reset every time the determination processing is executed, for example, opportunities of movement and an occurrence of a predetermined action during a match-up game such as a competition to win a specific number of the specific items among player characters can be provided for each determination processing and, accordingly, opportunities of match-ups can be created.

It should be noted that the "unpossessed state" indicates a state where possession of at least one specific item is canceled and, in the case of a player character possessing a plurality of specific items, the "unpossessed state" may be a state where the player character possesses specific items other than the canceled specific item.

Therefore, in this case, since superiority with respect to a player character possessing a plurality of specific items can be recognized in advance, situations that causes a player to evoke various strategies of a match-up game can be provided such as a strategy of avoiding match-ups as much as possible by collecting a plurality of specific items in an early stage after the start of the match-up game or advancing the match-up game with a focus on acquiring or collecting specific items.

In addition, examples of "rearrange" include once again arranging the specific item at a same position as a position where the specific item had been previously acquired by the player character (including a position where the specific item had been last acquired and a position upon earlier acquisitions than the last) and arranging the specific item at a position that differs from the same position. When the specific item is to be rearranged at a different position, the specific item may be randomly arranged.

(5) In the game system described above, the processor may be programmed to change the number of specific items capable of being acquired and possessed by each of the player characters depending on a game status.

According to the game system described above, an entertainment level of a match-up game can be improved by enabling various strategies to be adopted by players including, in a case where an item such as a backpack that enables a large number of items to be possessed is acquired in accordance with game progress and many specific items can be acquired in excess of determination criteria, collecting many specific items before another player character and causing the other player character to suffer a loss by virtue of not possessing the specific item or acquiring many specific items to be exempt over a long period of time from limitations due to determination processing.

It should be noted that examples of the "game status" include the following:

(F1) a timing at which a predetermined time has elapsed from the start of the game;

(F2) a record related to the match-up game such as a score or a rank of each player character or each group;

(F3) a record of each player character such as the number of victories in match-ups, a distance traveled, or the number of items acquired;

(F4) a state change of each player character such as a present stamina level or possessed items; and (F5) a position of a player character in a game field.

(6) In the game system described above, the processor may be programmed to, when a given provided item is specified as the specific item from a provided item group including provided items of a plurality of types which are provided during the match-up game, change a type of the specific item from the given provided item to other provided item at a given timing.

According to the game system described above, the type of the specific item can be changed depending on a game status or in accordance with an instruction of a specific player, by lottery, or the like at a given timing such as a timing of each execution of determination processing, a timing of occurrence of a given event, or a randomly set timing.

In other words, since the game system described above also requires a strategy to acquire a necessary specific item due to a change of a specific item, a game element can be incorporated even into acquisition and collection of specific items and, consequently, an entertainment level of the match-up game can be improved.

It should be noted that the specific item to be newly specified (in other words, another item that is changed to a specific item) includes items already acquired and possessed by a player character at a timing where the item is newly specified during the match-up game.

In particular, when a type of the specific item is changed, in order to adjust the number of specific items such as making the number of specific items smaller than the number of player characters continuously participating in the match-up game, preferably, for example, the newly determined specific item may be erased (for example, by self-destruction) from the game space or the specific items already being possessed by the player characters may be rearranged in the game space.

(7) In the game system described above, the processor may be programmed to change the determination criterion depending on a game status or in accordance with an instruction of the player among the plurality of players, the player using the player character satisfying a given first condition among the player characters.

According to the game system described above, for example, since a specific item to be used in determination criteria can be changed, a strategy for acquiring a necessary specific item can also be incorporated into the game as an important game element.

Therefore, the game system described above can incorporate a game element even into acquisition and collection of specific items and, consequently, improve an entertainment level of the match-up game.

It should be noted that examples of the player satisfying the given first condition includes the following:

(G1) a player having a predetermined item such as a radar;
(G2) a player having a specific capability such as clairvoyance or a future prediction capability; and
(G3) a player at a predetermined rank (for example, the highest rank) in terms of records, match-up records, or a parameter of which a value fluctuates during the course of a game.

In addition, examples of "change the determination criteria" include changing the determination criteria to be used in next determination processing and changing the determination criteria to be used in determination processing to be executed in the future such as determination processing after the next determination processing.

(8) In the game system described above, the processor may be programmed to grant a given privilege to the player character satisfying a given second condition among part of the player characters having satisfied the determination criterion during the given period.

According to the game system described above, for example, a privilege such as a predetermined item, in-game currency, or a right to determine a next specific item can be granted with respect to a player character satisfying a given second condition such as:

(H1) a player character having collected the most specific items or a player character having a specific item with highest quality (including an item that is more rare or more premium and an item to which a higher capability value is set) until the end timing of a given period (in other words, a period in which the determination criteria must be satisfied); and
(H2) a player character with the largest number of parameters such as a score, points, and in-game currency during the given period or until the determination criteria are satisfied.

Therefore, the game system described above can impart a game element to players even for acquisition and collection of specific items to improve an entertainment level of the match-up game.

(9) In the game system described above, the processor may be programmed to suggest to the player, in each given period, a remaining time until an end timing of the given period.

According to the game system described above, since each player can be made aware of a time limit for the player to satisfy next determination criteria, each player can be provided with information for drawing up a game strategy.

Therefore, since the game system described above can incorporate a game element even into acquisition and collection of specific items, an entertainment level of the match-up game can be improved.

It should be noted that examples of "suggest . . . a remaining time" include displaying a timer indicating the remaining time, changing a playback speed (rhythm speed) of sound effects (including songs) in accordance with the remaining time (increasing a rate of a heartbeat sound (a pulse) as the remaining time decreases), and changing a color combination of a screen visualizing a game space in accordance with the remaining time (making the screen darker or brighter as the remaining time decreases).

(10) In the game system described above, the processor may be programmed to execute display control for making the player among the plurality of players who operates the player character which differs from part of the player characters having acquired and possessing the specific item aware of possession of a specific item by the operated player character.

According to the game system described above, since a player operating a player character who has not yet acquired the specific item can be made aware of a player character who has already acquired the specific item, match-ups between player characters for the purpose of acquiring the specific item can be promoted.

In particular, since the game system described above can also set display control to perform display either based on an instruction of a player for each player character or automatically only during a predetermined period immediately preceding next determination processing, an effect of a psychological burden can be observed in accordance with the situation.

Therefore, the game system described above can create opportunities for match-ups and, as a result, invigorate the game.

It should be noted that examples of "display control" include displaying a display object indicating that a player character possesses the specific item by superimposing the display object on the player character or executing display control so that a player character possessing the specific item is displayed differently from a player character who does not possess the specific item.

(11) In the game system described above, the processor may be programmed to respectively control an end timing of the given period that repetitively arrives in accordance with a game status.

According to the game system described above, when a map contracts in accordance with a predetermined parameter (a stamina level or an experience point) of each player character or game progress, a time limit within which each player character must satisfy determination criteria can be controlled in accordance with a size of a game field.

Therefore, the game system described above can execute determination processing so that a specific player character does not gain an advantage or in conjunction with a match-up game. In addition, opportunities of movement and an occurrence of a predetermined action during a match-up game can be newly provided and, accordingly, opportunities of match-ups can be created without diminishing the intrinsic attractiveness of the match-up game. As a result, attractiveness as a match-up game can be enhanced.

(12) According to an embodiment of the invention, there is provided a method of executing a match-up game among a plurality of players using player characters set in a game space and providing a terminal with information related to the match-up game, the method of providing information related to the match-up game including:

executing control processing related to the match-up that uses the player characters among the plurality of players:

managing a specific item that is acquired by the player characters during the match-up game:

executing determination processing for repetitively determining whether or not each of the player characters satisfies a determination criterion related to the specific item in each given period during the match-up game:

when the processor has executed the determination processing and determined that a player character among the player characters does not satisfy the determination criterion at an end timing of the given period, executing participation-limiting processing for limiting participation in the match-up game by the player character; and changing a prerequisite related to the specific item in the determination processing to be disadvantageous to the player characters or changing the determination criterion to be disadvantageous to the player characters as compared to a determination criterion in previous determination processing every time the end timing arrives.

According to the method of providing information related to a match-up game described above, since new conditions for continuously participating in a match-up game other than, for example, a value of a parameter which is necessary for surviving the match-up game such as a stamina level or life energy can be provided, opportunities of an occurrence of predetermined actions such as movement and match-ups with other player characters during the match-up game including acquisition of a specific item and competition to win the specific item among player characters can be newly provided and, accordingly, opportunities of match-ups can be created.

Therefore, since the method of providing information related to a match-up game described above is capable of inevitably creating a large number of match-ups, the game can be invigorated and an entertainment level of the game can be improved.

Embodiments of the invention are described in detail below. It is noted that the following embodiments do not unduly limit the scope of the invention as stated in the claims. In addition, all of the components described in the following embodiments are not necessarily essential requirements of the invention.

1. Game System

First, an overview and a general configuration of a game system 1 according to an embodiment of the invention will be described with reference to FIG. 1. FIG. 1 is a diagram illustrating an example of a system configuration representing a configuration of the game system 1.

In the game system 1, as illustrated in FIG. 1, a server 10 which provides a game service and a terminal 20 (for example, terminals 20A, 20B, and 20C) are configured to be connectable to the Internet (an example of a network).

By accessing the server 10 from the terminal 20, a user can play a game being transmitted from the server 10 via the Internet. Furthermore, by accessing the server 10 from the terminal 20, the user can communicate with other users.

The server 10 is an information processing apparatus capable of providing a service that enables users to play a game using the terminal 20 connected to the server 10 via the Internet so as to be capable of communicating with the server 10. In addition, the server 10 may function as an SNS server which provides a communication-type service. In this case, an SNS server may be an information processing apparatus which provides a service that enables a plurality of users to communicate with each other.

Furthermore, for example, when the server 10 functions as an SNS server, the server 10 is capable of providing a game referred to as a social game which is executed using an operating environment (an application programming interface (API), a platform, or the like) of the SNS to be provided.

In particular, the server 10 is capable of providing games provided on a web browser of the terminal 20 including browser games (games which start by simply opening an installation site with a web browser) created in various languages such as HTML, FLASH, CGI, PHP, shockwave, a Java (registered trademark) applet, and JavaScript (registered trademark).

Social games differ from existing online games in that dedicated client software is not required, and include games that can be played with only a web browser and an SNS account. In addition, the server 10 is configured to be capable of being connected to a terminal (a smart phone, a personal computer, a game device, or the like) of another user via a network and providing an online game which enables a same game progress to be simultaneously shared online.

Meanwhile, the server 10 may be constituted by one (apparatus or processor) or a plurality of (apparatuses or processors).

In addition, information such as billing information and game information stored in a storage area (a storage unit 140 to be described later) of the server 10 may be stored in a database (a storage apparatus or a memory in a broad sense) connected via a network (an intranet or the Internet) or, when the server 10 functions as an SNS server, information such as a player information storage unit 146 stored in the storage area may be stored in a database (a storage apparatus or a memory in a broad sense) connected via a network (an intranet or the Internet).

Specifically, the server 10 is configured to receive input information based on an operation by a user (in other words, a player executing a game) of the terminal 20 and to perform game processing based on the received input information. In addition, the server 10 is configured to transmit a game processing result to the terminal 20, and the terminal 20 is configured to perform various types of processing so as to provide the game processing result received from the server 10 on the terminal 20 so as to be viewable for the user.

The terminal 20 is an information processing apparatus such as an image generating apparatus including a smart phone, a mobile phone, a PHS, a computer, a game apparatus, a PDA, and a mobile game device, and is capable of being connected to the server 10 via a network such as the Internet (a WAN) or a LAN. A communication line between the terminal 20 and the server 10 may be either wired or wireless.

In addition, the terminal 20 is provided with a web browser capable of viewing web pages (data in an HTML format). In other words, the terminal 20 is equipped with a communication control function for communicating with the server 10, a web browser function for performing display control using data (web data, data created in the HTML format, and the like) received from the server 10 and transmitting data of a user's operation to the server 10, and the like, and is configured to execute various types of processing in order to provide the user with a game screen and enable the user to execute a game. However, the terminal 20 may acquire game control information provided by the server 10 and execute predetermined game processing, and execute a game based on the game processing.

Specifically, when the terminal 20 makes a request to perform a predetermined game to the server 10, the terminal 20 is connected to a game site of the server 10 and a game is started. In particular, by using an API as necessary, the terminal 20 is configured to cause the server 10 functioning as an SNS server to perform predetermined processing or acquire the player information storage unit 146 managed by the server 10 functioning as an SNS server to execute a game.

2. Server

Figure 2:
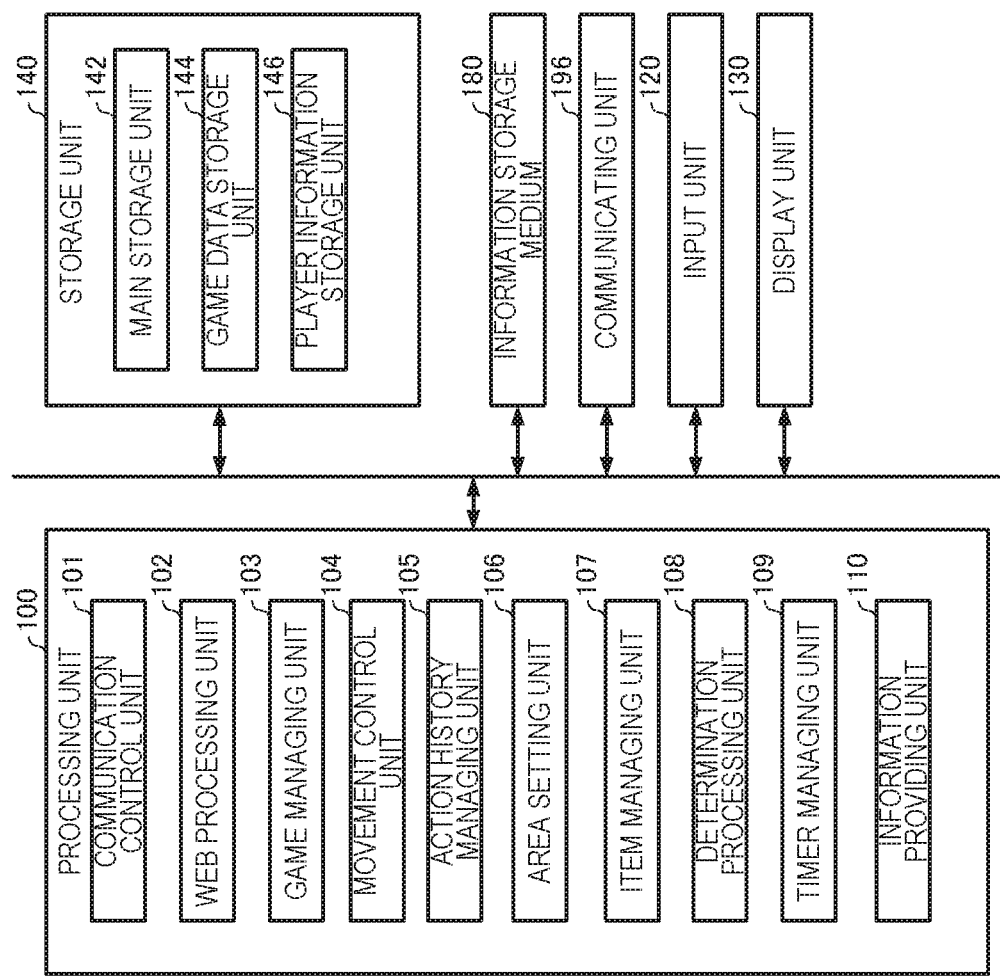
FIG. 2 is a diagram illustrating functional blocks of a server according to an embodiment of the invention.

Next, the server 10 will be described with reference to FIG. 2. Moreover, FIG. 2 is a diagram illustrating functional blocks of the server 10. Alternatively, a part of the components illustrated in FIG. 2 in the server 10 may be omitted.

The server 10 includes an input unit 120 used by an administrator or the like for input, a display unit 130 which performs predetermined display, an information storage medium 180 storing predetermined information, a communicating unit 196 for communicating with the terminal 20 and the like, a processing unit 100 which executes processing mainly related to a game to be provided, and the storage unit 140 storing a variety of data mainly used in the game.

The input unit 120 is used by a system administrator and the like to input settings related to a game and other necessary settings and to input data. For example, the input unit 120 is constituted by a mouse, a keyboard, or the like.

The display unit 130 is for displaying an operation screen for the system administrator. For example, the display unit 130 is constituted by a liquid crystal display or the like.

The information storage medium 180 (a computer-readable medium) stores a program, data, and the like, and a function of the information storage medium 180 is constituted by an optical disk (a CD or a DVD), a magneto-optical disk (MO), a magnetic disk, a hard disk, a magnetic tape, a memory (a ROM), or the like.

The communicating unit 196 performs various control for communicating with the outside (for example, a terminal, another server, or another network system), and a function of the communicating unit 196 is constituted by various processors, hardware such as a communication ASIC, a program, or the like.

The storage unit 140 serves as a work area for the processing unit 100, the communicating unit 196, and the like, and a function of the storage unit 140 is constituted by a RAM (VRAM) or the like. Moreover, information stored in the storage unit 140 may be managed by a database.

Furthermore, in addition to a main storage unit 142, the storage unit 140 has a game data storage unit 144 which stores game information indicating information related to a game and the player information storage unit 146 which stores player information indicating information related to each player and information related to the game of a player (hereinafter, referred to as "player-related information").

In particular, the game data storage unit 144 stores information on a game field where the game is carried out, condition information used to make various determinations, information on each object on the game field, information for changing each object, various table information, information related to a player character of each player, and the like.

In addition, the player information storage unit 146 stores, for each player, the following:

(A1) a nickname or a player ID of a player and, when the player belongs to a team, a team name or an ID of the team to which the player belongs (hereinafter, referred to as "affiliation information");

(A2) information related to a record of an individual and a team such as current points, acquired awards, or game time (hereinafter, also referred to as "record information");

(A3) information on characteristics and attributes of a player character;

(A4) information related to a match-up record such as the numbers of wins and losses against another player character or another team in a match-up game with the other player character or the other team (hereinafter, also referred to as "match-up record information");

(A5) positional information indicating a position of each player or team in a game field;

(A6) information (hereinafter, referred to as "energy parameter information") on a value (herein after, also referred to as an "energy parameter value") of a parameter which has a direct bearing on whether a player character of each player wins or loses such as an experience value or life energy and information on presence or absence of a loss (whether or not the game is over) (also referred to as "loss information");

(A7) information related to billing such as a billing history and a billed amount; and (A8) information related to types of items (including items used for determination processing to determine continuous participation in a match-up game to be described later) having been acquired and possessed by a player character, a capability of the items, and the number of items (hereinafter, referred to as "item information").

It should be noted that that the record information, the match-up record information, and the loss information included in the player information are updated at a timing determined in advance. Examples of the timing determined in advance include every given period (such as every 5 minutes), a timing at which a player logs out, a predetermined time of day (for example, 8:00 AM) in the game, and a timing at which a predetermined event occurs (a timing at which any inter-individual match-up or inter-team match-up ends).

In addition, basically, energy parameter information decreases in real time when interference such as an attack is sustained from another player character during a game and increases in real time when a recovery action such as eating a meal or getting rest is performed. Furthermore, energy parameter information is information which, when a value thereof reaches "0", the game being played by the player is over.

The processing unit 100 performs a variety of processing using the main storage unit 142 inside the storage unit 140 as a work area. Functions of the processing unit 100 can be realized by hardware such as various processors (a CPU, DSP, or the like) and an ASIC (a gate array or the like) or by programs.

The processing unit 100 performs various types of processing of the present embodiment based on the program (data) stored in the information storage medium 180. In other words, the information storage medium 180 stores a program that causes a computer to function as each unit (a program which causes a computer to execute processing of each unit) of the present embodiment.

For example, the processing unit 100 (processor) performs, based on a program stored in the information storage medium, overall control of the server 10 as well as a variety of processing including control of delivery of data and the like between the respective units. Furthermore, the processing unit 100 performs processing for providing various services in response to a request from the terminal 20.

Specifically, the processing unit 100 at least includes a communication control unit 101, a web processing unit 102, a game managing unit 103, a movement control unit 104, an area setting unit 106, an item managing unit 107, a determination processing unit 108, a timer managing unit 109, and an information providing unit 110.

The communication control unit 101 performs processing for transmitting and receiving data to and from the terminal 20 via the network. In other words, the server 10 performs a variety of processing based on information received by the communication control unit 101 from the terminal 20 and the like. In particular, the communication control unit 101 performs processing for transmitting, based on a request from the terminal 20 of a player, a game screen to the terminal 20 of the player.

The web processing unit 102 functions as a web server. For example, the web processing unit 102 performs, through a communication protocol such as Hypertext Transfer Protocol (HTTP), processing for transmitting data in response to a request by a web browser 211 installed on the terminal 20 and processing for receiving data transmitted by the web browser 211 of the terminal 20.

Moreover, while a case where the server 10 is also provided with a function as an SNS server will be described as an example according to the present embodiment, the server 10 may be separately formed as a game server and a server for SNS. In addition, the server 10 may perform a part of or all of processing of a game according to the present embodiment or the terminal 20 may perform a part of the processing of the game according to the present embodiment.

The game managing unit 103 constructs a game space as a virtual space in conjunction with the terminal 20, and based on an operation by a player input via the terminal 20, executes various kinds of game processing related to various match-up games including a battle game in which a match-up among a plurality of players involves battle or hand-to-hand combat, an action game, an RPG, a sound game, and a sport game.

In addition, during execution of a match-up game, the game managing unit 103 executes game processing related to a match-up such as battle between individuals or between groups (hereinafter, referred to as an "inter-individual match-up" or an "inter-group match-up").

In other words, the game managing unit 103 executes control processing related to a match-up using player characters among a plurality of players (or a plurality of groups).

In addition, the game managing unit 103 executes participation-limiting processing for limiting participation in a match-up game such as loss management based on loss information such as an energy parameter value of each player character and determination processing (hereinafter, referred to as "participation continuation determination processing") of determining participation continuation in the match-up game.

The movement control unit 104 controls movement inside a game space of a player character (hereinafter, also referred to as an "object player character") to be an operation object of each player to participate in a game in accordance with an operation input by the player to the terminal 20.

An action history managing unit 105 detects coordinates in a game field and an action of each player character during the game for each player character and at each predetermined timing, and sequentially causes the player information storage unit 146 to store information related to the detected action as action history information.

In addition, the action history managing unit 105 executes, at a predetermined timing, processing for predicting a future action of each player character based on an action by the player character at that time point.

The area setting unit 106 executes, during a game, game area setting processing for setting a game field (in other words, a game space) in which the game is executed to a first game area and a second game area that differs from the first game area in accordance with a detected progress status of the game.

In particular, in the present embodiment, the area setting unit 106 sets the game field to the first game area and the second game area by setting the entire game field to the first game area at the start of the game and converting a part of the first game area into the second game area in accordance with the progress status of the game.

The item managing unit 107 manages registration to the player information storage unit 146 or update of items (including a character to be used in match-ups and an item to be used in participation continuation determination processing (hereinafter, referred to as a "specific item")) which are used by a player character in a match-up game such as in-game currency, weapons to be used in the match-up game (including consumed weapons), and food and which are to be acquired and possessed by each player character as well as parameters indicating capabilities of such items.

In addition, the item managing unit 107 manages a position when arranging the specific item in a game space, the number of items to be arranged, and the like.

The determination processing unit 108 sets determination criteria and executes participation continuation determination processing for repetitively determining whether or not each player character satisfies the determination criteria related to the specific item for every given period (including a certain period and an irregular period) during a match-up game, and manages a prerequisite upon which execution of the participation continuation determination processing is to be premised.

The timer managing unit 109 has a timer function and is used in order to manage a progress status of the game. In particular, the timer managing unit 109 works in conjunction with the game managing unit 103 and outputs a current time of day and a time of day set in advance to each unit. In addition, the timer managing unit 109 is used to synchronize with each terminal.

The information providing unit 110 generates various kinds of game information (including information related to performance) that enables the terminal 20 to process a game and provides the terminal 20 concerned with the generated game information.

In particular, the information providing unit 110 generates, and provides the terminal 20 concerned with, a performance image that suggests, to a player:

(B1) when the participation continuation determination processing is repetitively executed every certain period or irregularly during a match-up game, a remaining time (in other words, a time limit) from the time point of execution of the participation continuation determination processing in each period (hereinafter, also referred to as a "determination period") to execution of next participation continuation determination processing; or (B2) a remaining time (a time limit) until an end of a period (hereinafter, similarly referred to as a "determination period") until the determination criteria in the participation continuation determination processing are satisfied during the match-up game.

In addition, the information providing unit 110 executes display control for causing a player character possessing a specific item to be recognized by a player operating a player character who differs from the player character.

3. Terminal

Figure 3:
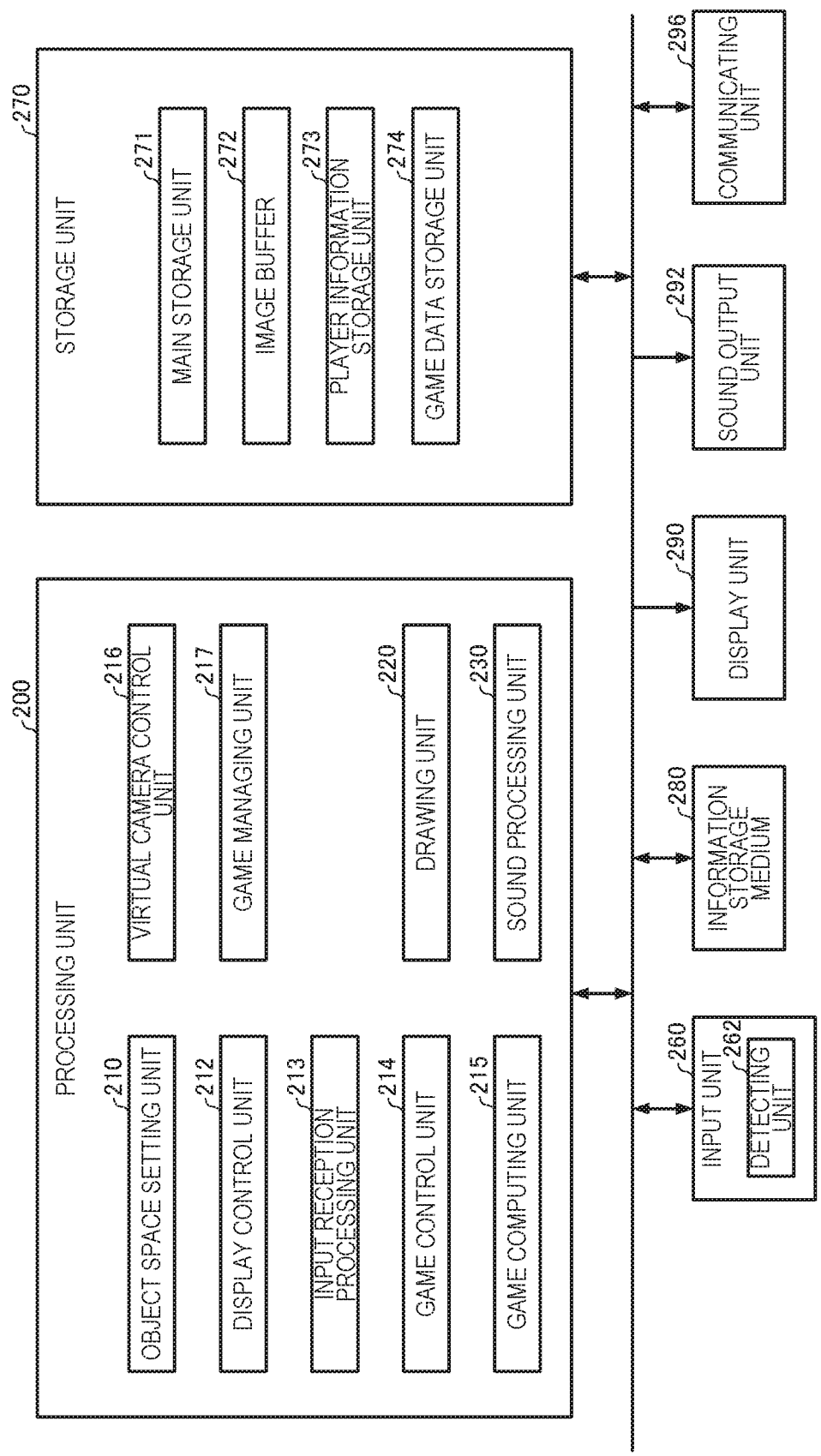
FIG. 3 is a diagram illustrating functional blocks of a terminal according to an embodiment of the invention.

Next, the terminal 20 will be described with reference to FIG. 3. Moreover, FIG. 3 is an example of a functional block diagram illustrating a configuration of the terminal 20. Alternatively, a part of the components illustrated in FIG. 3 in the terminal 20 may be omitted.

An input unit 260 is used by a player to input operation data, and a function thereof can be realized by a touch panel, a touch panel-type display, or the like. Specifically, the input unit 260 has a detecting unit 262 capable of detecting a two-dimensional instruction position coordinates (x, y) on a screen on which an image is to be displayed. For example, the input unit 260 has the detecting unit 262 capable of detecting two-dimensional contact position coordinates (x, y) in a contact detection region (a touch panel).

It should be noted that a contact operation on a display screen (hereinafter, referred to as a "touch panel" except in special circumstances) may be configured to be performed using a fingertip or performed using an input device such as a stylus.

In addition, the input unit 260 may include a button or a lever, a keyboard, a steering wheel, a microphone, an acceleration sensor, or the like which enables operation information (an operation signal) other than an instruction position to be input.

A storage unit 270 serves as a work area for the processing unit 200, a communicating unit 296, and the like, and a function of the storage unit 270 can be realized by a RAM (VRAM) or the like. In addition, the storage unit 270 includes a main storage unit 271 to be used as a work area, an image buffer 272 for storing a final display image and the like, user information 273 indicating information related to a user as a player with respect to a provided game, and a game data storage unit 274 for storing various kinds of data necessary for executing the game such as table data. Alternatively, the storage unit 270 may be configured such that a part of these components may be omitted, or the storage unit 140 of the server 10 may constitute a part of the components.

An information storage medium 280 (a computer-readable medium) stores a program, data, and the like, and a function of the information storage medium 280 can be realized by an optical disk (a CD or a DVD), a magneto-optical disk (MO), a magnetic disk, a hard disk, a magnetic tape, a memory (a ROM), or the like.

In addition, the information storage medium 280 can store a program that causes a computer to function as each unit (a program which causes a computer to execute processing of each unit) of the present embodiment. Moreover, as will be described later, the processing unit 200 performs various types of processing of the present embodiment based on the program (data) stored in the information storage medium 280.

A display unit 290 is for outputting an image generated by the present embodiment, and a function thereof can be realized by a CRT, an LCD, a touch panel-type display, a head-mounted display (HMD), or the like.

In particular, using a touch panel display enables the display unit 290 to also function as the input unit 260 used by a player to perform game operations. In this case, as the touch panel, a touch panel adopting a resistive system (a four-wire system or a five-wire system), a capacitance system, an electromagnetic induction system, an ultrasonic surface acoustic wave system, an infrared scanning system, or the like can be used.

A sound output unit 292 is for outputting sound generated in the present embodiment, and a function thereof can be realized by a speaker, a headphone, or the like.

A communicating unit 296 performs various control for communicating with the outside (for example, a host apparatus or another terminal), and a function of the communicating unit 296 can be realized by hardware such as various processors or a communication ASIC, a program, or the like.

It should be noted that the terminal 20 may receive a program or data which is stored in an information storage medium or the storage unit 270 included in the server 10 and which causes a computer to function as each unit of the present embodiment via the network, and store the received program or data in the information storage medium 280 or the storage unit 270. Cases where the terminal 20 functions by receiving a program and data in this manner can also be included in the scope of the invention.

The processing unit 200 (processor) performs, in conjunction with the server 10, processing such as game processing, image generating processing, and sound generating processing based on input data, a program, or the like from the input unit 260.

In particular, in the present embodiment, game processing includes processing for starting a game when game start conditions are fulfilled, processing for advancing the game, processing for arranging objects such as a player character and other player characters, processing for displaying the objects, processing for computing a game result, and processing for ending a game when game end conditions are fulfilled.

In addition, the processing unit 200 performs various kinds of processing using the storage unit 270 as a work area. Functions of the processing unit 200 can be realized by hardware such as various processors (a CPU, DSP, or the like) and an ASIC (a gate array or the like) or by programs.

In particular, the processing unit 200 includes an object space setting unit 210, a display control unit 212, an input reception processing unit 213, a game control unit 214, a game computing unit 215, a virtual camera control unit 216, a game managing unit 217, a drawing unit 220, and a sound processing unit 230. Alternatively, a part of these components of the processing unit 200 may be omitted.

The object space setting unit 210 performs processing for arranging and setting various objects (objects constituted by primitive surfaces such as sprites, billboards, polygons, free-form surfaces, and subdivision surfaces) representing a displayed article such as an object (a player character, a mobile body, and other player characters), a movement path, a building, a tree, a column, a wall, or a map (landform) in an object space.

Specifically, the object space setting unit 210 determines a position and an angle of rotation (synonymous with orientation and direction) of an object (a model object), and arranges the object at the position (X, Y) or (X, Y, Z) at the angle of rotation (angles of rotation around the X and Y axes) or (angles of rotation around the X, Y, and Z axes).

In this case, an object space includes both a so-called virtual two-dimensional space and a virtual three-dimensional space. A two-dimensional space is a space in which, for example, an object is arranged at two-dimensional coordinates (X, Y), and a three-dimensional space is a space in which, for example, an object is arranged at three-dimensional coordinates (X, Y, Z).

In addition, when the object space is a two-dimensional space, a plurality of objects are arranged based on a priority set with respect to each of the objects. For example, processing can be performed involving sequentially arranging objects (sprites) starting with an object to be shown as if the object is located on an inward side and overlapping an object to be shown as if the object is located on a front side on top of the inward-side object.

Furthermore, by arranging an object with a large drawing size in a lower part of an image and arranging an object with a small drawing size in an upper part of the image, an object space corresponding to the upper part of the image can be shown as though located on an inward side and an object space corresponding to the lower part of the image can be shown as though located on a front side.

Moreover, when the object space is a three-dimensional space, objects are arranged in a world coordinate system.

The display control unit 212 causes the display unit 290 to display information necessary for preventing a recurrence of an immovable state in the game field based on information transmitted from the server 10.

The input reception processing unit 213 receives an input instruction of a player having been input using the input unit 260 and outputs the received input instruction to the game control unit 214, the server 10, or both.

The game control unit 214 executes, in conjunction with the server 10, game processing based on a command received by the input reception processing unit 213.

In particular, the game control unit 214 executes control with respect to a character to be an operation object (in other words, a player character), a player character of another player, or another ancillary character based on various kinds of information about the game (game information, information related to a movement of a player character (including information related to a movement determination)) transmitted from the server 10, and a command (in other words, an input instruction) received by the input reception processing unit 213.

For example, the game control unit 214 executes a predetermined operation such as supporting attack on an enemy character or supporting capability recovery of an ally character in the case of a match-up game including an action game or a shooting game and growing crops or constructing a building in the case of a simulation game.

Meanwhile, the game control unit 214 performs a movement calculation of a character object that is an operation object such as a mobile body object (in particular, a character object such as a player character or other player characters) in an object space.

In other words, in conjunction with the server 10, the game control unit 214 performs processing for moving a mobile body object in an object space or controlling an action (motion or animation) of the mobile body object based on game information transmitted from the server 10 and input data input by a player using the input unit 260 or a program (a movement algorithm), various data (motion data), or the like.

Specifically, the game control unit 214 performs simulation processing for sequentially obtaining, for every frame, movement information (a direction of movement, an amount of movement, a speed of movement, a position, an angle of rotation, or an acceleration) and action information (a position or an angle of rotation of each part object) of an object. In this case, a frame refers to a unit of time when performing movement processing or action processing (simulation processing) of an object and image generation processing. In addition, in the present embodiment, a frame rate may be fixed or may be variable in accordance with processing load.

Moreover, the game control unit 214 executes processing for moving an object based on an input direction in a three-dimensional object space. For example, the game control unit 214 associates a direction of movement with each input direction in advance and moves the object in the direction of movement corresponding to the input direction.

In addition, the game control unit 214 may execute processes in conjunction with the server 10, and a part of or all of the game control unit 214 may be formed in the server 10.

The game computing unit 215 performs a variety of processing for game computation. In particular, the game computing unit 215 performs computing processes necessary for executing a shooting game such as formation of an object space determined in advance of the game, formation of an object space based on a map, progress of the game based on a scenario set in advance in accordance with an operation by the user, a match-up with a player character, other player characters, or other objects, and management of parameters during the match-up.

Moreover, while the game computing unit 215 executes the processes in conjunction with the server 10, a part of or all of the game computing unit 215 may be formed in the server 10.

The virtual camera control unit 216 generates an image that appears to have depth of a game space visible from a given perspective. In this case, the virtual camera control unit 216 performs control processing of a virtual camera (a perspective) for generating an image that is visible from a given (an arbitrary) perspective in the object space. Specifically, the virtual camera control unit 216 performs processing for controlling a position (X, Y, Z) or an angle of rotation (angles of rotation around the X, Y, and Z axes) of the virtual camera (processing for controlling a perspective position or a perspective direction).

For example, when photographing an object (for example, a character, a ball, or a vehicle) from behind with a virtual camera, the position or the angle of rotation of the virtual camera (an orientation of the virtual camera) is controlled so that the virtual camera tracks a change in the position or a change in the rotation of the object.

In this case, the virtual camera can be controlled based on the position, the angle of rotation, the speed, or the like of the object obtained by the game control unit 214. Alternatively, control may be performed for causing the virtual camera to rotate in an angle of rotation determined in advance or causing the virtual camera to move along a movement path determined in advance. In addition, in this case, the virtual camera is controlled based on virtual camera data for specifying a position (a movement path) or an angle of rotation of the virtual camera.

Moreover, the virtual camera may be set as a perspective of a player character. Furthermore, when a plurality of virtual cameras (perspectives) are present, the control processing described above is performed with respect to each virtual camera.

In conjunction with the server 10, the game managing unit 217 sets a player character and various items to be used by each player in a game such as a match-up game or the like based on an operation by the player input via the input unit 260, and registers the player character and the various items in the user information 273.

The drawing unit 220 performs image drawing processing based on various pieces of information related to image generation transmitted from the server 10 and results of a variety of processing (game processing) performed by the processing unit 200 and, accordingly, generates an image and outputs the generated image to the display unit (display) 290.

In particular, the image generated by the drawing unit 220 may be a so-called two-dimensional image or a so-called three-dimensional image. In particular, the drawing unit 220 generates an image which is visible from a virtual camera in an object space and which is to be displayed on a screen.

When generating a two-dimensional image, the drawing unit 220 sequentially draws objects in an ascending order of set priorities, and when objects overlap with each other, the drawing unit 220 draws the object with the higher priority on top.

In addition, when generating a three-dimensional image, the drawing unit 220 first receives input of object data (model data) including vertex data (positional coordinates, texture coordinates, color data, a normal vector, an α value, or the like of a vertex) of each vertex of an object (a model), and based on vertex data included in the input object data, performs vertex processing. When performing vertex processing, vertex generation processing (tesselation, curved surface division, or polygon division) for redividing a polygon may be performed if necessary.

In addition, in vertex processing, movement processing, coordinate transformation (world coordinate transformation or camera coordinate transformation), clipping processing, perspective transformation, or geometry processing such as light source processing of a vertex is performed, and based on a processing result thereof, vertex data provided with respect to a group of vertices that constitute an object is changed (updated or adjusted). Furthermore, rasterization (scan conversion) is performed based on the vertex data after the vertex processing, and a surface of a polygon (a primitive) is associated with pixels. Following the rasterization, pixel processing (fragment processing) for drawing pixels constituting an image (fragments constituting a display screen) is performed.

In pixel processing, various processing including texture reading (texture mapping), setting/changing of color data, translucent compositing, and anti-aliasing is performed to determine a final drawing color of pixels constituting an image, and drawing colors of an object subjected to translucent composition is output (drawn) to the image buffer 272 (a frame buffer: a buffer capable of storing image information in pixel units; a VRAM or a rendering target). In other words, in pixel processing, per-pixel processing is performed in which image information (a color, a normal, brightness, an α value, or the like) is set or changed in pixel units.

Accordingly, an image viewed from a virtual camera (a given perspective) set in an object space is generated. When a virtual camera (a perspective) exists in plurality, an image can be generated so that images viewed from the respective virtual cameras are displayed on one screen as divided images.

It should be noted that the vertex processing and the pixel processing performed by the drawing unit 220 may be realized in accordance with a shader program described in a shading language by a so-called programmable shader (a vertex shader or a pixel shader) that is hardware which makes drawing processing of a polygon (a primitive) programmable. With a programmable shader, making processing in vertex units and processing in pixel units programmable increases a degree of freedom of contents of drawing processing and significantly improves expressiveness as compared to static drawing processing by hardware.

In addition, when drawing an object, the drawing unit 220 performs geometry processing, texture mapping, hidden surface removal processing, a blending, and the like.

In geometry processing, processing such as coordinate transformation, clipping processing, perspective projection transformation, or a light source calculation is performed with respect to the object. In addition, object data (a positional coordinate, a texture coordinate, color data (brightness data), a normal vector, an α value, or the like of vertices of an object) after the geometry processing (after the perspective projection transformation) is stored in the storage unit 270.

In texture mapping, processing for mapping a texture (a texel value) stored in a texture storage unit of the storage unit 270 to an object is performed. Specifically, using a texture coordinate or the like set (added) to a vertex of an object, a texture (surface properties such as a color (RGB) and an α value) is read from the texture storage unit of the storage unit 270 and the texture that is a two-dimensional image is mapped to an object. In this case, processing for associating pixels and texels with each other and bilinear interpolation or the like as interpolation of texels are performed.

It should be noted that, in the present embodiment, processing for mapping a given texture may be performed when drawing an object. In this case, a color distribution (a texel pattern) of the texture to be mapped can be dynamically changed.

In addition, in this case, a texture with a different color distribution (a pixel pattern) can be dynamically generated, or a plurality of textures with different color distributions may be prepared in advance and a texture to be used may be dynamically switched to another texture. Furthermore, the color distribution of a texture may be changed in object units.

In the hidden surface removal processing, hidden surface removal processing according to Z-buffering (a depth comparison method, a Z test) using a Z-buffer (a depth buffer) is performed in which a Z-value (depth information) of a drawing pixel is stored. Specifically, when drawing a drawing pixel corresponding to a primitive of an object, the Z-value stored in the Z-buffer is referenced and the referenced Z-value of the Z-buffer and a Z-value in the drawing pixel of the primitive are compared with each other, and when the Z-value in the drawing pixel is a Z-value to the front as viewed from the virtual camera (for example, a smaller Z-value), drawing processing of the drawing pixel is performed and, at the same time, the Z-value of the Z-buffer is updated to a new Z-value.

In α blending (α compositing), the drawing unit 220 performs translucent compositing processing (straight α blending, additive α blending, or subtractive α blending) based on an α value (an A value). It should be noted that the α value is information that can be stored in association with each pixel (texel, dot) and is, for example, additional information other than color information. The α value can be used as mask information, translucency (equivalent to transparency and opacity), bump information, and the like.

In addition, the drawing unit 220 may generate an image to be displayed in a display region corresponding to a contact detection region. The image to be displayed in the display region may be, for example, an image including an object.

The sound processing unit 230 performs sound processing based on results of a variety of processing performed by the processing unit 200, generates game sounds including a BGM, a sound effect, and voices, and outputs the game sounds to the sound output unit 292.

4. Method 4.1. Overview

Next, an overview of a method (item management processing, participation-limiting processing, and participation continuation determination processing) according to one embodiment of the invention will be described with reference to FIG. 4.

Figure 4:
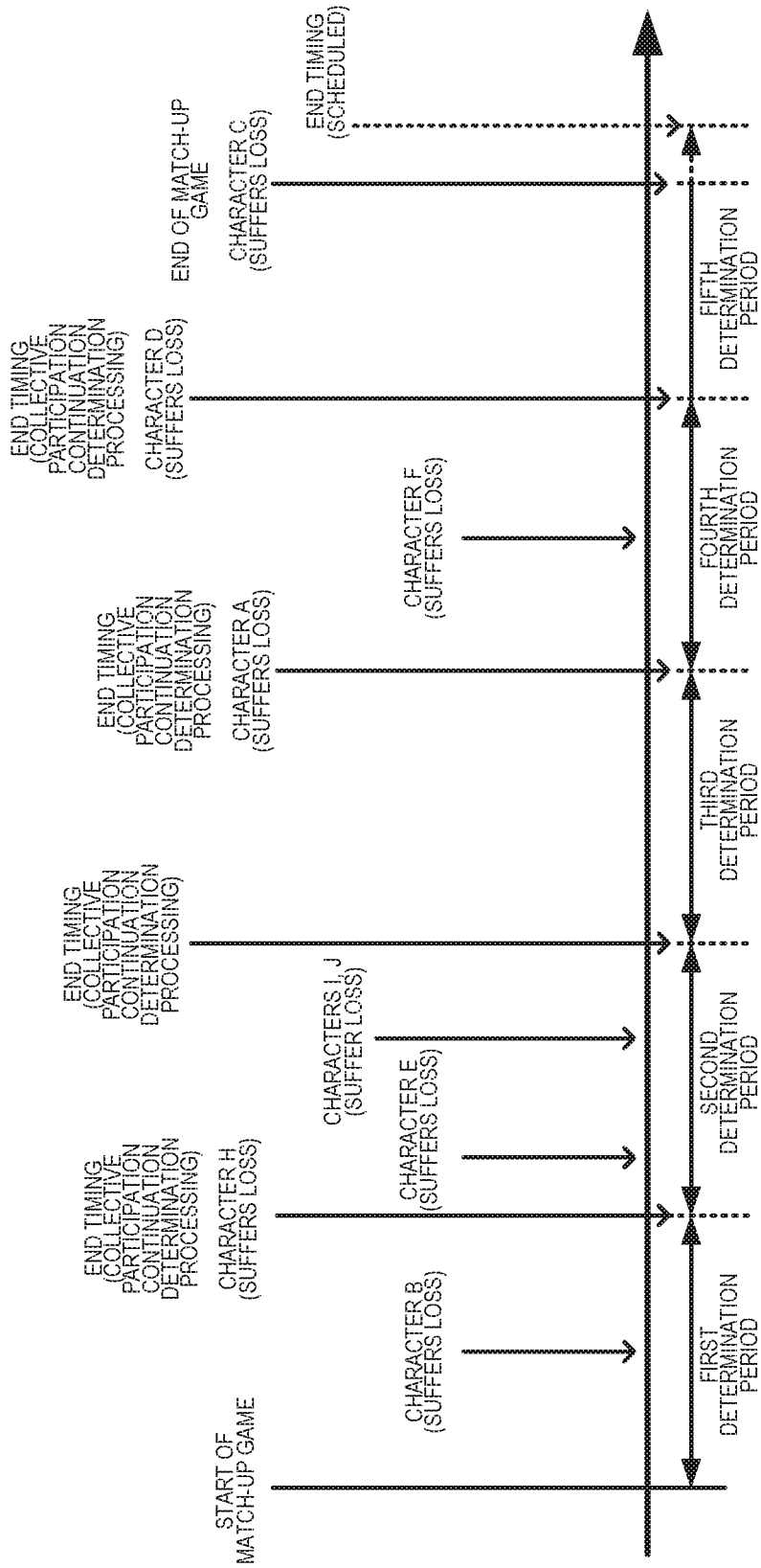
FIG. 4 is a diagram for explaining item management processing, participation-limiting processing, and participation continuation determination processing according to an embodiment of the invention.

FIG. 4 is a diagram for explaining item management processing, participation-limiting processing, and participation continuation determination processing.

For example, in conjunction with the terminal 20 operated by each player, the server 10 is configured to form a single game space (for example, a game field constituted by a virtual three-dimensional space) and execute a match-up game such as a battle game, an action game, an RPG, a sound game, or a sport game involving a plurality of player characters respectively operated and controlled by each player in the game field.

In addition, the server 10 is configured to execute a game involving the movement of and match-ups performed by the plurality of player characters in the game field formed in the game space and provide the terminal 20 with information related to the game.

In addition, the server 10 is configured to match a plurality of player characters or groups of the player characters with each other during a match-up game and control a match-up such as battle or hand-to-hand combat in the form of an inter-individual match-up or an inter-group (team) match-up.

On the other hand, the server 10 is configured to execute participation-limiting processing for repetitively determining, during a match-up game, for each set determination period, participation continuation in the match-up game with respect to each player character based on determination criteria set in advance, and when it is determined that the player character does not satisfy the determination criteria at an end timing or before the end timing of the determination period, limits participation by the player character in the match-up game such as loss management that involves causing the player character to suffer a loss from the match-up game in which the player character is participating.

In particular, the server 10 is configured to determine a specific item from items to be acquired by each player character in a match-up game and incorporate a new game element of causing each player character to suffer a loss from the match-up game unless the specific item is acquired before a determination period ends.

In other words, in order to invigorate a game and improve an entertainment level of the game, the server 10 is configured to create not only simply match-ups for survival but also match-ups for overcoming a risk of suffering a loss by enabling competition for winning a specific item to be performed. Therefore, the server 10 is capable of creating a situation where player characters compete to win a predetermined number of specific items, newly providing opportunities of movement and an occurrence of a predetermined action such as movement and match-ups with other player characters during a match-up game and, accordingly, creating opportunities of match-ups.

Specifically, the server 10 is configured to:

(A1) execute control processing related to a match-up using player characters among a plurality of players;

(A2) during a match-up game, manage a specific item that can be acquired by a player character;

(A3) execute participation continuation determination processing for repetitively determining whether or not each player character satisfies determination criteria related to the specific item for every given period during a match-up game; and (A4) when it is determined by the participation continuation determination processing that a player character does not satisfy the determination criteria at an end timing or before an end timing of the given period, execute participation-limiting processing for limiting participation of the player character in the match-up game.

In addition, the server 10 is configured to execute the following processing (hereinafter, referred to as "determination management processing") every time the end timing of a determination period arrives:

(A3-1) change a prerequisite related to the specific item in the participation continuation determination processing to be disadvantageous to a player character such as reducing the number of items (in other words, the total number of items) of specific items to be arranged in a game space, or (A3-2) change determination criteria (in other words, a quota) of each participation continuation determination processing to be disadvantageous to the player character (in other words, increase the quota) as compared to determination criteria in previous participation continuation determination processing such as increasing the number of specific items to be acquired every time determination processing is executed.

For example, let us assume that, as illustrated in FIG. 4, in a case where 10 players participate in a battle royale match-up game using player characters A to J and it is determined that each determination period is "5 minutes", a specific item is "apple", and determination criteria is "possessing one specific item", the server 10 executes participation continuation determination processing for determining whether or not each player character satisfies the determination criteria at an end timing of the determination period while executing inter-individual match-ups that is a main game element of the match-up game.

In this case, as illustrated in FIG. 4, when a stamina level of each player character drops to "0" in an inter-individual match-up between player characters from the start to the end of the match-up game, the server 10 executes processing for determining the game to be over for a player character whose stamina level had dropped to "0" and causing the player character to suffer a loss. In addition, when a participating player character does not possess one or more specific items "apple" at the end timing of each determination period, the server 10 executes respective processing for determining the game to be over for the player character not possessing an apple and causing the player character to suffer a loss.

FIG. 4 illustrates that, during a first determination period, a second determination period, and a fourth determination period, the game has respectively been determined to be over for the player character B, the player characters E, I, and J, and the player character F due to their stamina levels dropping to "0". In particular, FIG. 4 illustrates that, in first participation continuation determination processing, third participation continuation determination processing, and fourth participation continuation determination processing, the player character H, the player character A, and the player character D have respectively suffered a loss due to not possessing an apple.

In addition, FIG. 4 illustrates that, eventually, the player characters C and G had engaged in a match-up, the player character G had won the match-up and had been determined the winner, and that the match-up game had ended at a time point where the stamina level of the player character C had dropped to "0".

It should be noted that, in the example described above, the specific items acquired and possessed by each player character are reset (released) every time an end timing of the determination period arrives.

According to the configuration described above, in the present embodiment, new conditions for continuously participating in a match-up game can be provided in addition to, for example, a value of a parameter which is necessary for surviving the match-up game such as a stamina level or life energy. Therefore, opportunities of an occurrence of a predetermined action such as movement and match-ups with other player characters during a match-up game can be newly provided including as a competition among player characters to win a specific number of specific items and, accordingly, opportunities of match-ups can be created.

In addition, in the present embodiment, since a large number of match-ups can be created, the game can be invigorated and an entertainment level of the game can be improved.

In particular, in the present embodiment, for example, since it becomes more difficult to avoid match-ups with other players even when loss management is performed based on a parameter which is necessary for surviving the match-up game such as those described above, opportunities of match-ups can be created and, consequently, the game can be invigorated.

It should be noted that, in the present embodiment, a game space in which a match-up game is to be executed may be a three-dimensional space or a two-dimensional space and need only be a space in which a game field is formed.

4.2. Specific Item

Next, a specific item according to the present embodiment will be described.

A specific item is the following:
(A1) items to be used by a player character during a match-up game such as in-game currency, weapons to be used in a match-up game (including consumed weapons such as bullets), or items to be consumed such as medicine and food; or
(A2) an item indicating a given certificate or credentials of a player such as a trophy, a cup, or a medal, or simply an item to be solely used in participation continuation determination processing including such items.

In addition, before a match-up game, at a predetermined timing in each determination period, or at an end timing of each determination period, a specific item may be randomly arranged over an entire region in a game space or randomly arranged in a region which is formed in the game space and which is an area (in other words, an area in which activity is recommended: for example, a first game area) outside a penalty area (for example, a second game area) in which a disadvantage to a player character is enjoyed as long as the player character is present in the region, or may be arranged at a specific location (a fixed spot).

Furthermore, when the specific item is arranged in a game space, the specific item is arranged so as to be recognizable by players. For example, specific performance processing (such as an arrangement position emitting light) for causing a position of the specific item to be recognized by each player is executed.

A player character acquires a specific item by collecting the specific item being arranged or by acquiring (including a takeover and a handover) the specific item from another player. In particular, a player character is configured to acquire a specific item when coming into contact with the specific items arranged in the game space.

In addition, when the specific item is arranged at the fixed spot described above, a constraint such as not enabling the specific item to be acquired when another item such as a key (preferably, randomly arranged in the game space) is absent.

In other words, in this case, a specific item may be:
(B1) arranged using an object such as a barrier or an interior of a locked warehouse such that the specific item cannot be acquired unless a player character destroys or unlocks the object; or
(B2) configured based on a position or the like where the specific item is arranged such that the specific item cannot be acquired unless a task is completed.

In addition, instead of being arranged in advance in a game space, a specific item may be acquired by a player character concerned when given conditions are satisfied during execution of a match-up game such as the number of match-ups or the number of wins.

On the other hand, when a specific item is possessed by a player character including a specific character such as an NPC, the specific item may be acquired by a player character having won a match-up with the player character possessing the specific item. The specific item may be moved from a player character who is in possession of the specific item (hereinafter, referred to as a possessing player character) to a player character satisfying predetermined conditions when predetermined conditions based on a relationship between the player characters are satisfied (for example, when present for 3 seconds within 1 m behind the possessing player character or when an exploitation item is used). The specific item may be moved between player characters belonging to a same team by swapping with another game value or for free.

In addition, when a specific item is acquired by and possessed by a player character, processing for moving the specific item inside a game space in accordance with a movement of the player character and processing for making one aware at a predetermined timing that the specific item is being possessed by another player are executed.

On the other hand, in the present embodiment, specific items of a plurality of types may be arranged in a game or provided to a player character, and a player character may be allowed to possess specific items of a plurality of types or a plurality of specific items of a same type.

In addition, as described above, when a specific item is an item to be used by a player character in a match-up game, various parameters (hereinafter, referred to as "specific item parameters") may be defined.

For example, specific item parameters include a level defined for a specific item, an experience point (including lives or points), and parameters that define attributes and characteristics.

It should be noted that, in the present embodiment, a specific item of which the number decreases or the quality deteriorates simply by being possessed by a player character may be used. In this case, the number or the quality of the specific item possessed by the player character may vary in accordance with the specific item and affect determination processing in each player character.

4.3. Participation Continuation Determination Processing

Figure 5:
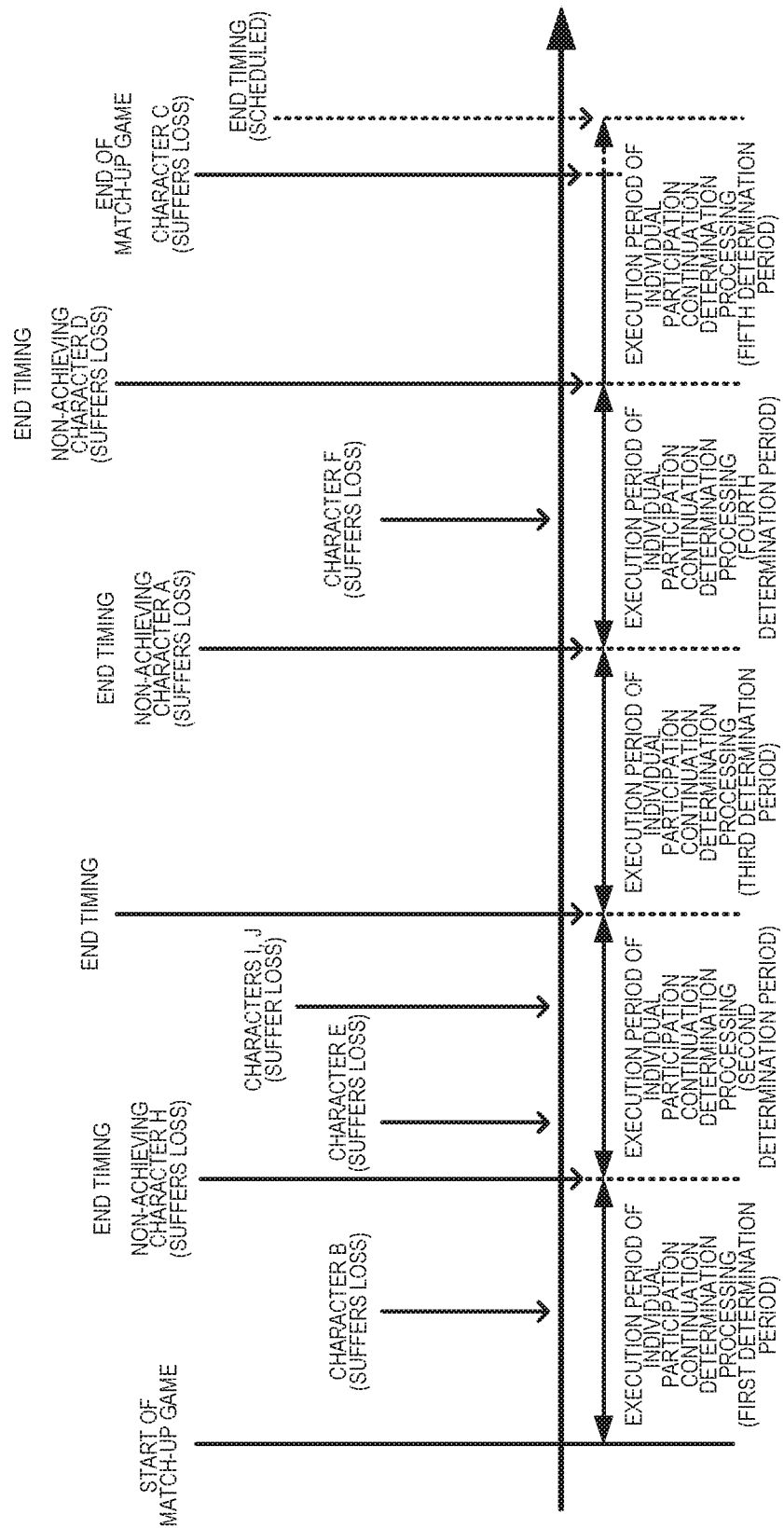
FIG. 5 is a diagram for explaining participation continuation determination processing which is executed by a determination processing unit according to an embodiment of the invention.

Next, participation continuation determination processing which is executed by the determination processing unit 108 will be described with reference to FIG. 5. FIG. 5 is a diagram for explaining participation continuation determination processing which is executed by the determination processing unit 108.

4.3.1. Basic Principle of Participation Continuation Determination Processing

The determination processing unit 108 executes participation continuation determination processing for repetitively determining whether or not each player character satisfies determination criteria related to a specific item for every determination period that is a given period during a match-up game.

In addition, the determination processing unit 108 determines a duration of the determination period for repetitively executing the participation continuation determination processing before the start of a match-up game or during the match-up game and, at the same time, determines (changes) determination criteria in each determination period.

Specifically, during a match-up game, for example, the determination processing unit 108 determines (changes) a duration of a next determination period in each determination period and, at the same time, executes processing (hereinafter, referred to as "determination criteria changing processing") of determining (in other words, changing) the determination criteria depending on a game status or the like.

In addition, the determination processing unit 108 executes one of the two types of participation continuation determination processing described below:

(A1) as illustrated in FIG. 4 described above, at an end timing of each determination period, participation continuation determination processing on a collective basis (hereinafter, referred to as "collective participation continuation determination processing") with respect to all player characters participating in a match-up game based on determination criteria determined prior to the start of the match-up game or during a determination period preceding a determination period in which changed determination criteria are to be used; or (A2) as illustrated in FIG. 5, during each determination period and before the end timing of the determination period, participation continuation determination processing on an individual basis (hereinafter, referred to as "individual participation continuation determination processing") for each player character based on determination criteria determined prior to the start of a match-up game or during the match-up game.

In particular, the determination processing unit 108 preferably determines which of the participation continuation determination processing is to be executed among the participation continuation determination processing described above prior to the start of a match-up game.

In addition, as the individual participation continuation determination processing, as illustrated in FIG. 5, the determination processing unit 108 determines, in each determination period, whether or not each player character satisfies the determination criteria every time a predetermined event is executed such as a timing at which a player character who is a determination object acquires an item or at each timing (for example, per minute during a match-up game) determined in advance.

Furthermore, in the individual participation continuation determination processing, when it is determined during a determination period that the player character who is a determination object satisfies the determination criteria, the game managing unit 103 is configured not to execute participation-limiting processing (limiting participation in a match-up game with respect to an object player character) until a next determination period is started.

FIG. 5 illustrates game specifications in a case where 10 players participate in a battle royale match-up game using player characters A to J and it is determined that each determination period is "5 minutes", a specific item is "apple", and determination criteria is "possessing one specific item", and individual participation continuation determination processing for determining whether or not each player character satisfies the determination criteria is executed during the determination period while executing inter-individual match-ups that is a main game element of the match-up game.

In addition, FIG. 5 illustrates the following:

(B1) when a stamina level of each player character drops to "0" in an inter-individual match-up between player characters from the start to the end of the match-up game, the game is determined to be over for a player character whose stamina level had dropped to "0" and the player character suffers a loss;

(B2) when a participating player character possesses one or more of the specific items "apple" during each determination period (hereinafter, also referred to as an "execution period of individual participation continuation determination processing"), participation continuation in the match-up game is determined with respect to the player character; and (B3) when a participating player character is unable to acquire and possess the specific item "apple" and fails to satisfy the determination criteria until the end timing of each determination period, the game is determined to be over for the player character (hereinafter, also referred to as "non-achieving character") having failed to satisfy the determination criteria and the player character suffers a loss.

Specifically, FIG. 5 illustrates the following:

(C1) during the first determination period, the second determination period, and the fourth determination period, the game has respectively been determined to be over for the player character B, the player characters E, I, and J, and the player character F due to their stamina levels dropping to "0";

(C2) during the first determination period, all player characters other than the player characters B and H satisfied the determination criteria and, at the same time, the player character H failed to satisfy the determination criteria and suffered a loss;

(C3) during the second determination period, among the participating player characters (in other words, those other than the player characters B and H), all player characters other than the player characters E, I, and J satisfied the determination criteria;

(C4) during the third determination period, among the participating player characters (in other words, those other than the player characters B, E, H, I, and J), all player characters other than the player character A satisfied the determination criteria and, at the same time, the player character A failed to satisfy the determination criteria and suffered a loss; and (C5) during the fourth determination period, among the participating player characters (in other words, those other than the player characters A, B, E, H, I, and J), all player characters other than the player characters F and D satisfied the determination criteria and, at the same time, the player character D failed to satisfy the determination criteria and suffered a loss.

In addition, in a similar manner to FIG. 4, FIG. 5 illustrates that, eventually, the player characters C and G had engaged in a match-up, the player character G had won the match-up and had been determined the winner, and that the match-up game ended at a time point where the stamina level of the player character C had dropped to "0".

Furthermore, in the example described above, while the determination processing unit 108 resets (releases) the specific items acquired and possessed by each player character every time the end timing of a determination period arrives, alternatively, possessed states may be maintained as-is without being reset.

In addition to the above, details of the determination criteria changing processing according to the present embodiment will be described in the section of processing (hereinafter, referred to as "determination management processing") of managing the participation continuation determination processing.

4.3.2. Determination Period

The determination processing unit 108 may set a duration (in other words, an end timing) of each determination period of participation continuation determination processing that is repetitively executed in a certain period determined in advance or may irregularly change the duration of the determination period of the participation continuation determination processing that is repetitively executed. In addition, when irregularly changing the duration of the determination period of the participation continuation determination processing, the duration of the determination period is preferably varied so that a specific player character does not gain an advantage or in conjunction with a match-up game.

In particular, when varying the duration of each determination period, the determination processing unit 108 respectively controls the end timings of the respective determination periods which repetitively arrive depending on a game status.

Specifically, in this case, the determination processing unit 108 preferably sets a determination period so that the end timing arrives at:

(D1) in a case of a battle royale-type survival game, at each timing determined based on the number or a stamina level (an average value, ½ of a maximum value and a minimum value, or the like) of surviving player characters;
(D2) in a case where a map contracts as a game progresses, at each timing determined based on a size of a game field;
(D3) at each timing determined based on a level or each player character or each player or a difference between such levels;
(D4) at each timing determined based on types (configurations) of player characters engaged in a match-up or the like; or
(D5) at each timing that arrives in a combination of two or more of (D1) to (D4).

4.3.3. Determination Criteria

The determination processing unit 108 may:
(E1) determine same determination criteria to be used in each determination period before the start of a game or every time the end timing of the determination period arrives, and execute each participation continuation determination processing using the same determined determination criteria (in other words, participation continuation determination processing using same determination criteria across all determination periods from the start to the end of a match-up game); or
(E2) determine, during a match-up game, different determination criteria to be used in each determination period or in some determination periods depending on a game status or in accordance with an instruction of a player satisfying given conditions, and execute each participation continuation determination processing using each of the determined determination criteria.

In addition, determination criteria include the following:
(F1) having acquired one or more specific items;
(F2) having acquired a plurality of specific items (a plurality of items of a same type or a combination of items of different types); and
(F3) having used an acquired specific item (other conditions may be included when using the specific item such as use in a predetermined state of a player character such as an invincible state, use in a predetermined area or a predetermined stage, use during a predetermined event period, or use in combination with another item).

In particular, when determining whether or not a plurality of specific items have been acquired, in order to maintain participation by many player characters and invigorate the game, the number of acquisitions of the specific items that can be acquired by one player character is preferably limited. In this case, an upper limit number of the specific items which each player character can possess (in other words, an upper limit number in possession) may be changed during a match-up game.

In addition, the game status in the determination criteria in (E2) described above includes the following:
(E2A-1) a timing at which a predetermined time has elapsed from the start of the game;
(E2A-2) a record related to the match-up game such as a score or a rank of each player character or each group;
(E2A-3) a record of each player character such as the number of victories in match-ups, a distance traveled, or the number of items acquired;
(E2A-4) a state of each player character such as a present stamina level or possessed items; and
(E2A-5) a position of a player character in a game field.

Furthermore, the given conditions (hereinafter, referred to as "designatable player conditions") in (E2) described above include the following:
(E2B-1) being a player having a predetermined item such as a radar;
(E2B-2) being a player having a specific capability such as clairvoyance or a future prediction capability; and
(E2B-3) being a player at a predetermined rank (for example, the highest rank) in terms of records, match-up records, or a parameter of which a value fluctuates during the course of a game.

Moreover, concrete determination criteria to be used in the participation continuation determination processing in (E1) and (E2) include the following:
(G1) having acquired one or more specific items and possessing the specific items at a time point of the participation continuation determination processing;
(G2) having acquired a plurality of specific items (a plurality of items of a same type or a combination of items of different types) and possessing the specific items at a time point of the participation continuation determination processing; and (G3) having already used the acquired specific items.

In particular, the use of the specific items in (G3) may include other conditions upon use such as use in a predetermined state of a player character such as an invincible state, use in a predetermined area or a predetermined stage, use during a predetermined event period, or use in combination with another item.

4.4. Determination Management Processing

Figure 6:
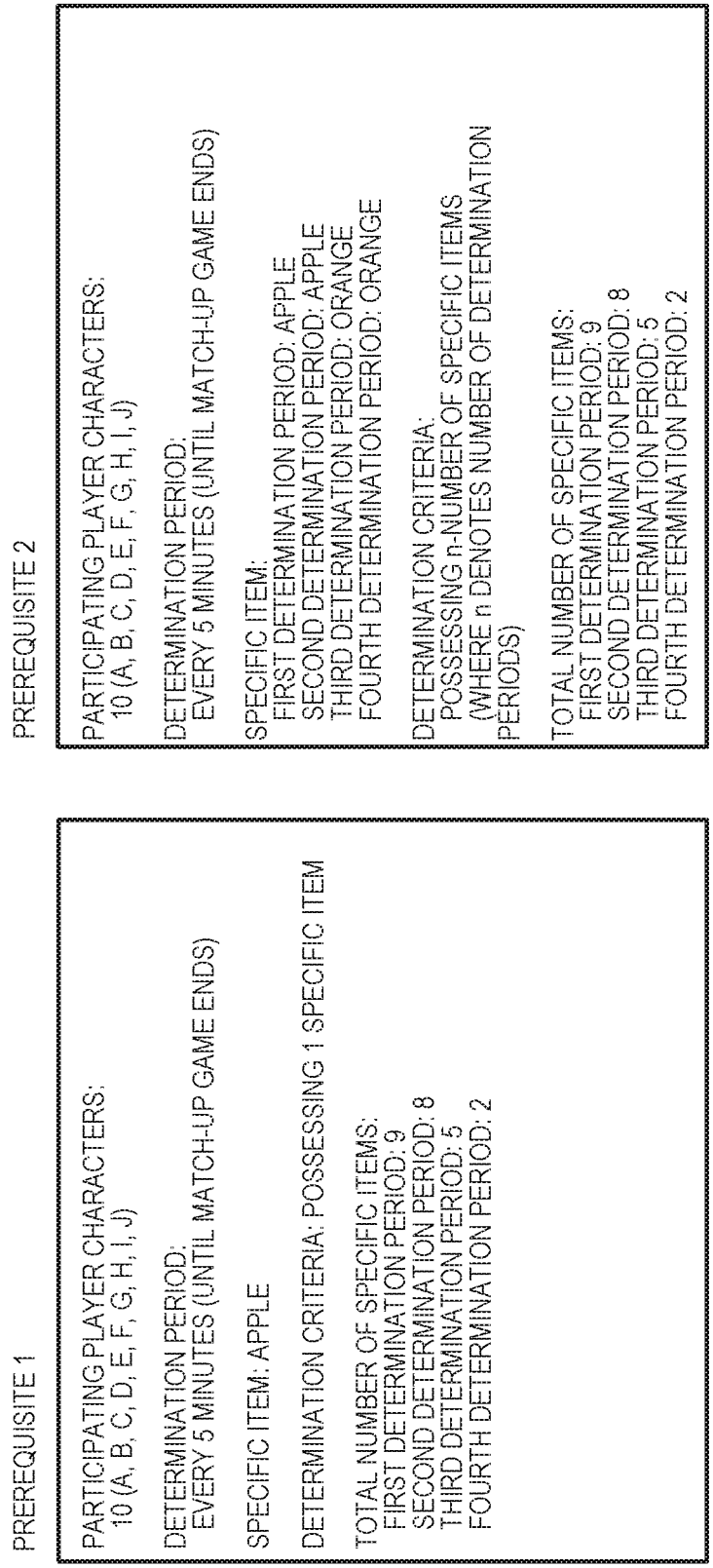
FIG. 6 is a diagram for explaining determination management processing (prerequisite changing processing and determination criteria changing processing) which is executed by the determination processing unit according to an embodiment of the invention.

Next, determination management processing which is executed by the determination processing unit 108 will be described with reference to FIG. 6. FIG. 6 is a diagram for explaining determination management processing which is executed by the determination processing unit 108.

4.4.1. Basic Processing of Determination Management Processing

The determination processing unit 108 executes any of the following processing as the determination management processing:

(A1) determination criteria advance determination processing for determining determination criteria in each determination period prior to the start of the game;

(A2) every time the end timing of a determination period arrives, change a prerequisite related to a specific item in participation continuation determination processing (in other words, next participation continuation determination processing) to be executed in a determination period following the determination period concerned to be disadvantageous to a player character (hereinafter, referred to as "prerequisite changing processing"); or (A3) every time the end timing of a determination period arrives, change determination criteria of participation continuation determination processing to be executed in a determination period following the determination period concerned to be disadvantageous to the player character as compared to determination criteria in the participation continuation determination processing (in other words, previous participation continuation determination processing) executed during the determination period of which the end timing had arrived (hereinafter, referred to as "determination criteria changing processing").

In addition, basically, the determination processing unit 108 causes the determination criteria advance determination processing, the prerequisite changing processing, or the determination criteria changing processing to be selected and executed or causes a combination thereof to be selected and executed based on specifications of a match-up game, a type of the match-up game, a selection made by a manager of the match-up game, or the like.

4.4.2. Determination Criteria Advance Determination Processing

Prior to the start of a game, the determination processing unit 108 determines determination criteria of each determination period based on specifications of a match-up game, a type of the match-up game, a selection made by a manager of the match-up game, or the like, and executes processing (hereinafter, referred to as "prerequisite setting processing") of setting various prerequisites (in other words, specifications) related to a specific item such as a position at which a specific item is to be arranged, the number of items, acquisition conditions (various conditions related to a player character such as whether or not there is another item that the player character desires to acquire, completion of a task, or an experience point or the like at the time of acquisition), or a combination thereof upon which participation continuation determination processing based on the determination criteria is to be premised.

It should be noted that, even with determination criteria advance determination processing, the determination processing unit 108 may determine different determination criteria to be used in each determination period or in some determination periods instead of using the same determination criteria in all determination periods, and execute each participation continuation determination processing using each of the determined determination criteria.

In addition, based on the various set prerequisites related to a specific item, the item managing unit 107 defines a position at which the specific item is to be arranged in a game space, the number of items, acquisition conditions (various conditions related to a player character such as whether or not there is another item that the player character desires to acquire, completion of a task, or an experience point or the like at the time of acquisition), or the like prior to the start of a game or every time the end timing of a determination period arrives, and sets each specific item in the game space.

4.4.3. Prerequisite Changing Processing

As the prerequisite changing processing, the determination processing unit 108 may change the various prerequisites related to a specific item such as a position at which the specific item is to be arranged in a game space, the number of items, acquisition conditions (various conditions related to a player character such as whether or not there is another item that the player character desires to acquire, completion of a task, or an experience point or the like at the time of acquisition), or a combination thereof prior to the start of a game and every time the end timing of a determination period arrives.

In addition, in this case, based on contents of the change to the specific item in each determination period, the determination processing unit 108 may determine determination criteria in each determination period (specifically, a next determination period) or may only change the prerequisites and use the same determination criteria.

Furthermore, during a determination period concerned, the determination processing unit 108 executes participation continuation determination processing for each player character using the determined determination criteria or using the same determination criteria.

Specifically, as the prerequisite changing processing, in order to realize competition among player characters for a specific number (the total number arranged in a game space) of specific items, the determination processing unit 108 sets the total number of the specific items arranged in the game space which can be acquired by player characters smaller than the number of player characters continuously participating in a match-up game every time the end timing of a determination period arrives.

In other words, in this case, the determination processing unit 108 is configured to be capable of making a player character unable to acquire the specific item until a next determination period ends inevitably present every time a determination period ends and inevitably creating a player character that loses every time a determination period ends.

For example, as indicated in prerequisite 1 illustrated in FIG. 6, the determination processing unit 108 may reduce the total number of items by one or a plurality every time the end timing of a determination period arrives. In particular, the determination processing unit 108 may determine the number of items to be reduced every time the end timing of a determination period arrives including reducing the number of items by different numbers such as by "1" for a first time and by "2" for a second time.

In addition, in this case, when the determination criteria are a predetermined number of acquisitions of the specific items (for example, "1") and the specific items acquired by each player character are reset every time a determination period ends, the determination processing unit 108 preferably reduces one or more of the specific item (for example, one specific item) every time the end timing of a determination period arrives.

It should be noted that prerequisite 1 in FIG. 6 illustrates specifications including prerequisites in a case where 10 players participate in a battle royale match-up game using player characters A to J and it is determined that each determination period is "5 minutes", a specific item is "apple", and determination criteria is "possessing one specific item", and the total number of the specific items arranged in a game space is reduced every time the determination period is repeated.

In particular, prerequisite 1 in FIG. 6 illustrates the following:
(B1) the total number of items in first collective participation continuation determination processing is 9;
(B2) the total number of items in second collective participation continuation determination processing is 8;
(B3) the total number of items in third collective participation continuation determination processing is 5; and
(B4) the total number of items in fourth collective participation continuation determination processing is 2.

Furthermore, in this case, the determination processing unit 108 may maintain a same number of the specific items instead of reducing the number of the specific items in a given period immediately after predetermined determination processing.

In particular, even in such a case where the same number is maintained, the number of the specific items after a plurality of executions of the participation continuation determination processing may be reduced from the number of the specific items during a previous execution of the participation continuation determination processing. In addition, for example, when the specific item is arranged in a game space including an area (an area (for example, a second game area) which is provided in a part of the game space, of which a size changes in accordance with an elapsed time from the start of a game, and which is hereinafter referred to as a "penalty area") where a penalty (for example, a reduction in a parameter such as a stamina level) is imposed to player characters present, the number of the specific items arranged inside the penalty area may be set larger than the number of specific item upon a previous execution of the determination processing and may be substantially set smaller than the number of specific items.

4.4.4. Determination Criteria Changing Processing

Every time the end timing of a determination period arrives, the determination processing unit 108 executes determination criteria changing processing for determining determination criteria to be used in a determination period (including a plurality of determination periods) subsequent to the determination period concerned or in some determination periods to be used in the future depending on a game status (see above) or in accordance with an instruction of a player satisfying the given first condition.

In particular, in order to incorporate a game element even into the acquisition and collection of specific items, every time the end timing of a determination period arrives, the determination processing unit 108 determines (in other words, changes) determination criteria (specifically, criteria to be changed so as to be disadvantageous to a player character as compared to determination criteria in the determination processing concerned) in order to execute individual participation continuation determination processing depending on a game status or in accordance with an instruction of a player satisfying the given first condition.

In addition, the determination processing unit 108 uses the following as the instruction of a player satisfying the given first condition:
(C1) a player having a predetermined item such as a radar;
(C2) a player having a specific capability such as clairvoyance or a future prediction capability; and
(C3) a player at a predetermined rank (for example, the highest rank) in terms of records, match-up records, or a parameter of which a value fluctuates during the course of a game.

Specifically, when a given provided item is specified as a specific item from a provided item group including provided items of a plurality of types which are provided during a match-up game, the determination processing unit 108 executes determination criteria changing processing for changing a type of the specific item from the given provided item to another provided item at a given timing.

In addition, the determination processing unit 108 may cause a specific item (in other words, another item that is changed to a specific item) to be newly specified to be already acquired and possessed by a player character at a timing newly specified during the match-up game.

For example, in the prerequisites described above, as illustrated in prerequisite 2 in FIG. 6, the determination processing unit 108 executes the determination criteria changing processing for changing the specific item from "apple" to "orange" in determination criteria in the participation continuation determination processing that is executed in a third determination period after a second determination period.

For example, as illustrated in prerequisite 2 in FIG. 6, as the determination criteria changing processing, the determination processing unit 108 may further increase the number of possessed specific items every time a determination period is repeated.

It should be noted that prerequisite 2 in FIG. 6 illustrates an example in which the number of possessed specific items is increased by 1.

In addition, when a type of the specific item is changed, in order to adjust the number of specific items such as making the number of specific items smaller than the number of player characters continuously participating in the match-up game, for example, the determination processing unit 108 may erase (for example, by self-destruction) the newly determined specific item from the game space or rearrange the specific item already in the possession of a player character in the game space.

Furthermore, instead of changing the type of the specific item, the determination processing unit 108 may execute determination criteria changing processing for changing the number of possessed specific items.

4.4.5. Granting Privileges

The determination processing unit 108 may grant a given privilege with respect to a player character satisfying the given second condition among player characters having satisfied the determination criteria during a determination period.

In particular, the determination processing unit 108 grants a privilege such as a predetermined item, in-game currency, rights to determine a type or a number of a specific item to be used in participation continuation determination processing in a next determination period to a player character satisfying the following as the given second condition:
(E1) a player character having collected the most specific items or a player character having a specific item with highest quality (including an item that is more rare or more premium and an item to which a higher capability value is set) until the end timing of a determination period in which the determination criteria must be satisfied; or
(E2) a player character with the largest number of parameters such as a score, points, and in-game currency during the given period or until the determination criteria are satisfied.

It should be noted that, in the individual participation continuation determination processing, as the given privilege, when a player having acquired a predetermined number of the specific items emerges during the given period or until determination criteria are satisfied the determination processing unit 108 may determine the player to be a winner of a match-up game and end the game at that time point.

In addition, in the collective participation continuation determination processing, as the given privilege, the determination processing unit 108 may determine a player having acquired a predetermined number of the specific items as a result of executing determination processing at the end timing of a determination period to be a winner of a match-up game and end the game. However, in this case, when there are a plurality of players having acquired the predetermined number of the specific items, the determination processing unit 108 may determine a player with the largest number of possessed specific items or a player with an earliest time point of acquisition of a last specific item to be a winner of a match-up game and end the game.

4.5. Specific Item Management Processing

Next, specific item management processing which is executed by the item managing unit 107 will be described.

4.5.1. Basic Processing of Specific Item Management Processing

The item managing unit 107 manages individual specific items of each player character including acquisition, possession, and release (reset) of the specific items.

In addition, the item managing unit 107 arranges a specific item in a game space prior to the start of a game in accordance with prerequisites set by prerequisite setting processing such as a position (an arrangement position) at which the specific item is to be arranged in a game space, the number of items, acquisition conditions (conditions related to a player character such as whether or not there is another item that the player character desires to acquire, whether or not a task is to be completed, or an experience point or the like at the time of acquisition which are conditions for acquiring the specific item), or a combination thereof. Furthermore, in accordance with the prerequisites set by various types of prerequisite changing processing related to a changed specific item, the item managing unit 107 arranges the specific item in the game space every time the end timing of a determination period arrives. In this manner, the item managing unit 107 executes control to enable a player character concerned to acquire the specific item.

In addition, for example, the item managing unit 107 may arrange the specific item at a position determined in advance (in other words, an initially-set position) at the start of a match-up game, and during the match-up game, the item managing unit 107 may arrange the specific item at a same position as a position where the specific item had previously been acquired by a player character (including a position where the specific item had been last acquired and a position where the specific item had been acquired upon earlier acquisitions than the last) or arrange the specific item at a position that differs from the same position. Furthermore, when the specific item is to be arranged at a different position, the item managing unit 107 may randomly arrange the specific item.

It should be noted that, basically, when the item managing unit 107 detects that a player character has come into contact with a specific item arranged in a game space, the item managing unit 107 causes the player character having made contact to acquire the specific item and register the specific item as item information of the player character in the player information storage unit 146. However, when an upper limit number of possessed specific items has been determined, the item managing unit 107 causes the player information storage unit 146 to store the specific item as item information of the player character concerned only when the upper limit number of possessed specific items is not reached.

4.5.2. Processing of Specific Item Possessed by Player Character Whose Participation is Limited When participation in a match-up game by a player character possessing a specific item is suspended such as when a stamina level or life energy of the player character drops to "0", the item managing unit 107 may arrange the specific item in the game space so as to be acquirable by player characters other than the player character concerned whose participation is limited.

For example, in order to make player characters compete for a specific item, when a player character not yet possessing the specific item (hereinafter, referred to as an "non-possessing player character") engages in a match-up with a player character possessing the specific item (hereinafter, referred to as a "possessing player character"), life energy of the possessing player character drops to "0", and the possessing player character loses the match-up, the item managing unit 107 causes the specific item possessed by the possessing player character to be acquired by the non-possessing player character.

In addition, for example, in this case, the item managing unit 107 may move the specific item from the losing possessing player character to the non-possessing player character at the time point of the loss or may move the specific item to the non-possessing player character after the specific item is released from the losing possessing player character to a vicinity of the possessing player character or a specific position determined in advance in a game space and a predetermined action (specifically, a picking-up action) by the non-possessing player character is detected.

It should be noted that, when participation in a match-up game is suspended, the item managing unit 107 may disable or enable a return to the match-up game.

Furthermore, the conditions for suspending participation include the following cases where a game can no longer be continued:
(A1) a case where a parameter other than life energy which is necessary for surviving a match-up game such as a stamina level drops to "0";
(A2) a case where a communication line is cut off when a match-up game is being executed though communication; or
(A3) a case where a player voluntarily cancels participation in the match-up game.

In addition, in such a case, the item managing unit 107 may perform control as a loss and arrange the specific item in the game space so as to be acquirable by player characters other than the player character concerned whose participation has been limited.

Furthermore, as an example of the specific item being "arranged . . . in the game space", the item managing unit

107 may leave the specific item unattended at a position in the game space where participation by a player character possessing the specific item has been prohibited and may arrange the specific item at a specific position in the game space.

Moreover, when participation by a specific player character in a match-up game is suspended, the item managing unit 107 may deprive the specific player character of all possessed specific items and may rearrange the specific items in a game space or cause a non-possessing player character who is a match-up opponent to execute acquisition of the specific items. In addition, the item managing unit 107 may deprive the specific player character of a part of possessed specific items and may rearrange the deprived specific items or cause a non-possessing player character who is a match-up opponent to execute acquisition of the specific items.

4.5.3. When Resetting Possession of Specific Item for Each Participation Continuation Determination Processing The item managing unit 107 may:

(B1) every time the participation continuation determination processing is executed, change a possessed state of the possessing player character who possesses the specific item from the possessed state to an unpossessed state where the player character does not possess the specific item; and (B2) rearrange the specific item in the possession of the player character during the possessed state in the game space so as to be acquirable by each player character.

In other words, the item managing unit 107 is configured to be capable of resetting a possessed state of a specific item every time the participation continuation determination processing is executed.

It should be noted that, in order to change to an unpossessed state, the item managing unit 107 need only cancel possession of at least one specific item. In this case, with respect to a possessing player character who possesses a plurality of specific items, the item managing unit 107 may allow the possessed state of the specific items other than the canceled specific item to be continued.

4.5.4 Change to Number of Possessed Specific Items by Player Character

For example, the item managing unit 107 may change the number of specific items which is acquired by and which can be possessed by each player character depending on a game status such as a timing at which a predetermined time has elapsed from the start of a game.

In particular, the item managing unit 107 is configured to enable various strategies to be adopted with respect to each player when a setting that enables many specific items to be possessed is in effect at the start of a game such as collecting a large number of a specific item before another player character and causing the other player character to suffer a loss by virtue of not possessing the specific item and acquiring many specific items to be exempt over a long period of time from limitations due to participation continuation determination processing.

For example, the item managing unit 107 is configured to enable the number of possessed specific items to be varied based on the following:

(C1) a timing at which a predetermined time has elapsed from the start of the game;

(C2) a record related to a match-up game such as a score or a rank of each player character or each group;

(C3) a record of each player character such as the number of victories in match-ups, a distance traveled, or the number of items acquired;

(C4) a state change of each player character such as a present stamina level or possessed items; or (C5) a position of a player character in a game field.

4.5.5. Rearrangement of Specific Item Possessed by Player Character

When a player character having a specific item enters a penalty area (a second game area) and a predetermined period elapses from the entry, the item managing unit 107 may deprive the player character of the possessed specific item and rearrange the deprived specific item in an area (a first game area) outside of the penalty area.

4.6. Participation-Limiting Processing

Next, participation-limiting processing which is executed by the game managing unit 103 will be described.

When it is determined by the participation continuation determination processing (in other words, the collective participation continuation determination processing or the individual participation continuation determination processing) that a player character does not satisfy the determination criteria at the end timing of a determination period, the game managing unit 103 executes participation-limiting processing for limiting participation of the player character in a match-up game.

Specifically, the game managing unit 103 executes the participation-limiting processing with respect to the following:

(A1) in the case of the collective participation continuation determination processing, a player character determined not to satisfy determination criteria among all player characters at the end timing of a determination period; or (A2) in the case of the individual participation continuation determination processing, a player character who does not satisfy determination criteria until the end timing of a determination period.

In addition, as the participation-limiting processing, the game managing unit 103 executes the following with respect to a player character who is an object:

(B1) suspension processing for suspending participation in a match-up game subsequent to the determination processing concerned (in other words, processing to make game over);

(B2) banning processing for temporarily banning participation in the match-up game subsequent to the determination processing concerned (in other words, processing to cause interruption); or (B3) penalty processing for imposing a penalty such as making a predetermined item unacquirable, or resetting a value of a predetermined parameter (such as an experience point, a stamina level, or the like) or forcibly setting the value to a disadvantageous value.

4.7. Other Control

Figure 7B:
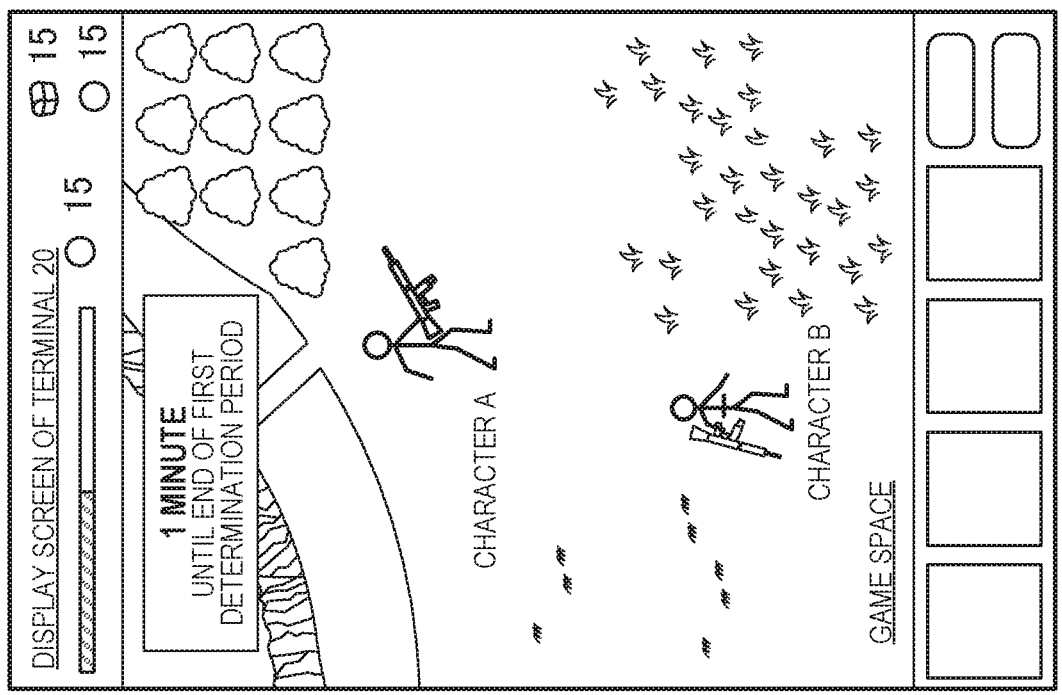
FIGS. 7A and 7B are diagrams for explaining various types of control processing which are executed by an information providing unit according to an embodiment of the invention.
Figure 7A:
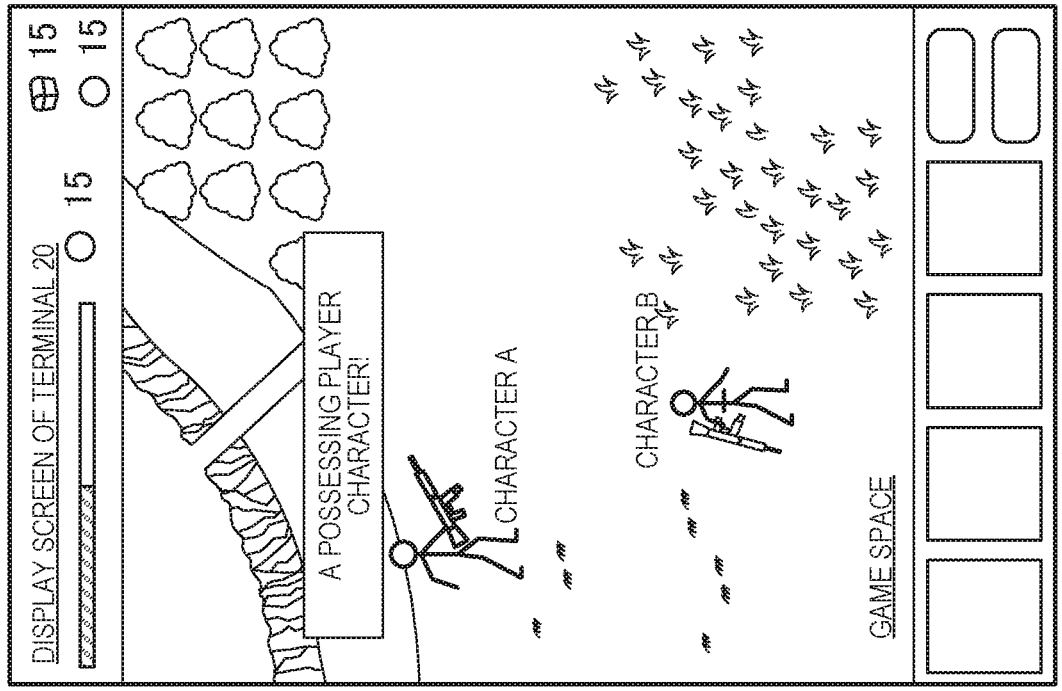

Next, various types of control processing which are executed by the information providing unit 110 will be described with reference to FIGS. 7A and 7B. It should be noted that FIGS. 7A and 7B are diagrams for explaining various types of control processing which is executed by the information providing unit 110.

4.7.1. Performance Control Processing of Determination Period

The information providing unit 110 may execute performance control for suggesting to a player, for each determination period, a remaining time until an end timing of the determination period in conjunction with the timer managing unit 109.

In other words, the information providing unit 110 acquires information on a remaining time until the end timing of a determination period from the timer managing unit 109 having started measurement at the start of the determination period and notifies a player executing a match-up game of the acquired remaining time.

Specifically, the information providing unit 110 executes control for displaying the remaining time on a game screen (specifically, on a display screen that is displayed on the terminal 20) that is viewed by each player or executes control for causing the terminal 20 to output sound effects indicating the remaining time.

For example, as illustrated in FIG. 7A, the information providing unit 110 executes processing for controlling the terminal 20 so as to cause the following:

(A1) display a timer indicating the remaining time;

(A2) change a playback speed (rhythm speed) of sound effects (including songs) in accordance with the remaining time (increasing a rate of a heartbeat sound (a pulse) as the remaining time decreases); or (A3) change a color combination of a screen visualizing a game space in accordance with the remaining time (make the screen darker or brighter as the remaining time decreases).

It should be noted that FIG. 7A illustrates an example of a display screen that displays a timer indicating a remaining time for each determination period on each terminal 20.

4.7.2. Display Control Processing for Possessing Player Character

The information providing unit 110 may execute display control processing for making a player operating a player character who differs from a player character having acquired and is in possession of a specific item aware of the fact that the player character concerned possesses the specific item.

In other words, in order to make a player operating a player character who has not yet acquired the specific item aware of a player character who has already acquired the specific item, the information providing unit 110 executes display control indicating that a possessing player character possesses the specific item when the possessing player character is displayed on the terminal 20 of the player concerned.

For example, when the possessing player character is displayed on the terminal 20 concerned, the information providing unit 110 executes the following as illustrated in FIG. 7B:

(B1) superimpose and display a display object indicating the fact that the possessing player character possesses the specific item; or (B2) display control to differentiate a player character concerned from other player characters.

It should be noted that FIG. 7B illustrates an example of a display screen in which a display object reading "A possessing player character!" representing the fact that the possessing player character (a character A) possesses the specific item is superimposed and displayed on the terminal 20 of the player operating a non-possessing player character.

In addition, the information providing unit 110 may execute processing with respect to a non-possessing player of making a player character of a non-possessing player unrecognizable from the possessing player by using a predetermined item (such as eyeglasses) on the possessing player.

Specifically, the information providing unit 110 is configured to execute display control for causing, to be recognizable, the fact that a player character concerned possesses the specific item.

Furthermore, when the possessing player character has a predetermined item (such as a stealth item or a transparent cloak), the information providing unit 110 may execute control to not display the fact that the possessing player character possesses the specific item on the terminal 20 concerned.

4.7.3. Display Control Processing of Determination Criteria

During each determination period, the information providing unit 110 executes display control for displaying, on the terminal 20, determination criteria of the determination period concerned, determination criteria of next or subsequent determination periods, or both determination criteria.

In this case, during each determination period, the determination processing unit 108 specifies determination criteria (including changed determination criteria) of the next or subsequent determination periods and, based on information on the specified determination criteria, the information providing unit 110 executes display control for displaying the determination criteria of next or subsequent determination periods on the terminal 20.

On the other hand, the information providing unit 110 may execute display control for displaying the acquired present determination criteria, determination criteria subsequent to the present determination criteria, or both on the terminal 20 so as to be recognizable only by players having a cheating item that enables the player to recognize each determination criteria.

4.7.4. Match-Up Game Based on Avoidance of Acquisition of Specific Item

In the present embodiment, in place of a match-up game in which a player character collects specific items and executes determination processing in a determination period and a determination is made on whether or not the collected specific items satisfy determination criteria, a match-up game may be adopted in which a specific item such as a bomb is randomly distributed to predetermined player characters in advance, ownership of the specific item is mutually shifted (transfer of ownership is mutually executed) through match-ups or the like, and determination processing causes a player character who ends up possessing the specific item to lose the match-up game.

It should be noted that, in such a game, an item that reduces capabilities or a stamina level of a player character may be adopted as the specific item besides bombs.

5. Operations

Next, operations of match-up game processing including item management processing, participation-limiting processing, and participation continuation determination processing which is executed by the server 10 will be described with reference to FIGS. 8 and 9.

Figure 8:
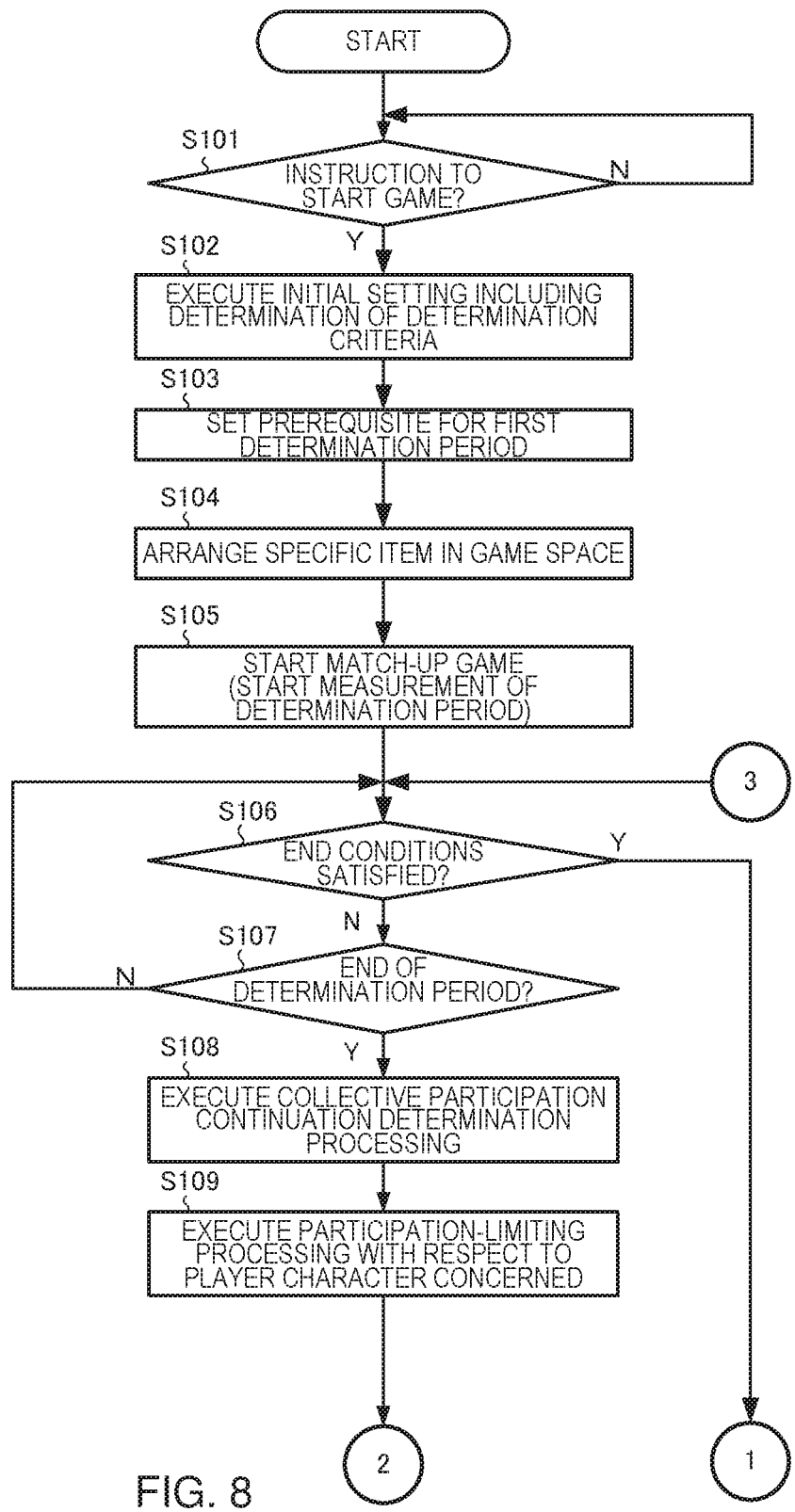
FIG. 8 is a flow chart illustrating operations of match-up game processing including item management processing, participation-limiting processing, and participation continuation determination processing which is executed by a server according to an embodiment of the invention.
Figure 9:
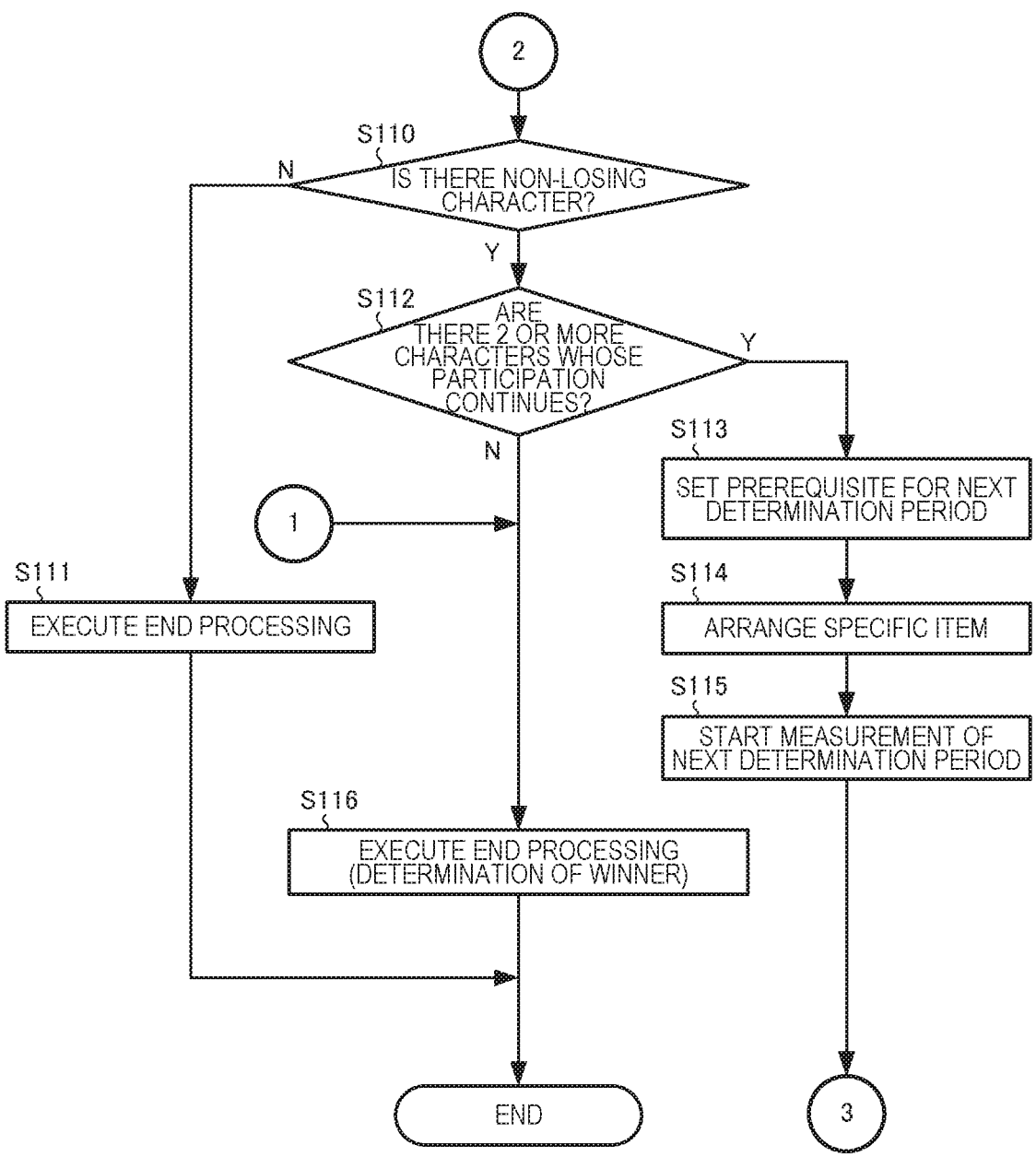
FIG. 9 is a flow chart illustrating operations of match-up game processing including item management processing, participation-limiting processing, and participation continuation determination processing which is executed by a server according to an embodiment of the invention.

It should be noted that FIGS. 8 and 9 are flow charts illustrating operations of the match-up game processing including item management processing, participation-limiting processing, and participation continuation determination processing which is executed by the server 10.

The present operations assume participation by a plurality of players and that a battle royale match-up game by the plurality of players is to be executed.

In the present operations, it is also assumed that initial settings of a player character who is an operation object have been completed by each player. As the participation continuation determination processing, a case where participation continuation determination processing (in other words, collective participation continuation determination processing) is collectively executed with respect to all player characters at the end timing of each determination period will be described.

First, when the game managing unit 103 receives an instruction to start a game including completion of preparations for the match-up game by all players (step S101), the game managing unit 103 performs initial settings in the match-up game in conjunction with the determination processing unit 108 (step S102).

Specifically, the determination processing unit 108 sets each determination period as the initial setting and executes determination criteria advance determination processing for determining determination criteria in each determination period.

Next, based on determination criteria in a first determination period among the determined determination criteria of the respective determination periods, the determination processing unit 108 sets various prerequisites related to a specific item in the first determination period (step S103).

Next, the item managing unit 107 arranges the specific item in a game space based on the set prerequisite related to the specific item in the set first determination period (step S104).

Next, the game managing unit 103 starts a match-up game and starts various types of game processing related to the match-up game among individuals or among teams (step S105).

Next, the game managing unit 103 determines whether or not game end conditions such as a reduction in the number of player characters or the number of teams to 1 have been satisfied (step S106).

At this point, the game managing unit 103 makes a transition to the processing of step S109 when it is determined that the game end conditions are not satisfied but makes a transition to the processing of step S116 when it is determined that the game end conditions are satisfied.

Next, the determination processing unit 108 determines whether or not the end timing of a determination period has arrived (step S107).

At this point, the determination processing unit 108 makes a transition to the processing of step S106 when it is determined that the end timing of a determination period has not arrived but makes a transition to the processing of step S108 when it is determined that the end timing of a determination period has arrived.

Next, the determination processing unit 108 executes the collective participation continuation determination processing to determine whether or not already-set determination criteria are satisfied with respect to each player character participating in the match-up game (step S108).

Next, the determination processing unit 108 executes participation-limiting processing in which a player character determined not to satisfy the determination criteria in the participation continuation determination processing suffers a loss in the match-up game (step S109).

Next, the game managing unit 103 determines whether or not there is a player character (hereinafter, referred to as a "non-losing character") who has not yet suffered a loss the due to participation-limiting processing (in other words, the presence or absence of a player character whose participation is continuing) (step S110).

At this point, the game managing unit 103 makes a transition to the processing of step S111 when it is determined that there is no non-losing character but makes a transition to the processing of step S112 when it is determined that there is a non-losing character.

Next, when it is determined that the number of player characters present is "0" in the processing of step S110, the game managing unit 103 ends the game with no winner or executes predetermined end processing in the match-up game such as determining a winner from player characters having suffered a loss immediately previously (step S111), and ends the present operations.

It should be noted that, as the end processing in a match-up game, the game managing unit 103 executes various types of processing for ending the match-up game such as determining a last non-losing player character as the winner, determining a winner from losing player characters, and determining an order of the respective player characters.

On the other hand, when it is determined in the processing of step S110 that there is a player character who has not yet suffered a loss due to the participation-limiting processing, the game managing unit 103 determines whether or not the number of player characters present is "2" or more (step S112).

At this point, when the game managing unit 103 determines that the number of player characters present is "2" or more, the determination processing unit 108 sets various prerequisites related to a specific item in a next determination period based on determination criteria in the determination period (step S113).

Next, the item managing unit 107 arranges the specific item in a game space based on the set prerequisite related to the specific item in the next determination period (step S114).

Next, the game managing unit 103 starts measurement of the next determination period (step S115) and makes a transition to the processing of step S106.

On the other hand, when the game managing unit 103 determines in the processing of step S106 that the end conditions are satisfied or determines in the processing of step S113 that the number of player characters present is not "2" or more, the game managing unit 103 determines the player character present as a winner, executes various types of end processing for ending the match-up game (step S116), and ends the present operations.

It should be noted that, in the present operations, the game managing unit 103 handles a case where the number of player characters present is "0" as a case with no winner in the processing of step S110. However, in place of the processing of step S111, the game managing unit 103 may:

(A1) extend the determination period of the determination processing concerned and make a transition to the processing of step S106;

(A2) determine a player character who is nearest to the determination criteria at that time point as the winner and end the present operations; or (A3) restart the present operations from the processing of step S113.

6. Other

The invention is not limited to the embodiments described above and various modifications can be made thereto. For example, any term cited with a different term having a broader meaning than or the same meaning as the term at least once in the description or the drawings may be replaced by the different term in any place in the description or the drawings.

The embodiments described above may provide terminals 20 with each game using a single server 10 or may cause a plurality of servers 10 to operate in conjunction with one another to construct a server system and have the server system provide the terminals with each game.

Furthermore, while a game provided by the server 10 is being executed by the terminal 20 in the embodiments described above, the game described above may be realized by having the server 10 execute each function of the processing unit 200 of the terminal 20 with the exception of operation input and execute a game program and having the terminal 20 execute operation input and image display by streaming.

In addition, the embodiments described above may be realized by a single game apparatus having the functions of the server 10 or, in other words, an apparatus (stand-alone) which operates independently without relying on other devices such as a server and, in this case, a plurality of input terminals need only be available.

Furthermore, such a game terminal may be connected in plurality in a wired or wireless manner, and a single game apparatus can be realized by a plurality of game apparatuses o function as the server 10.

Moreover, while the game system according to the invention is applied to the server 10 which executes the game system in conjunction with the terminal 20 via a network in the embodiments described above, the game system can also be applied as a tablet-type information terminal, a personal computer, or a game apparatus installed at an amusement park.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A game system which executes a match-up game among a plurality of players using player characters set in a game space and which provides a terminal with information related to the match-up game, wherein the game space includes a game field formed in a virtual space, and wherein the terminal of each of the players displays the match-up game in the game space, the game system comprising a processor programmed to:
    execute control processing related to the match-up that uses the player characters among the plurality of players;
    manage a specific item, of a plurality of specific items, that is acquired by participating player characters among the player characters during the match-up game, and that is used by the participating player characters in the match-up game;
    execute determination processing for repetitively determining whether or not each of the participating player characters satisfies a determination criterion related to the specific item in each given period during the match-up game;
    when the processor has executed the determination processing and determined that a first player character among the participating player characters does not satisfy the determination criterion at an end timing of the given period of time, the control processing executes processing that determines to end a participation, to temporarily ban the participation, or to continue the participation while imposing a penalty, in the match-up game of the first player character;
    change a prerequisite related to the specific item in the determination processing to be disadvantageous to the player characters or change the determination criterion to be disadvantageous to the player characters as compared to a determination criterion in previous determination processing every time the end timing arrives; and
    wherein, when a state of a second player character among the participating player characters satisfies a predetermined condition by the end timing of the given period, the control processing executes processing that determines to end the participation in the match-up game of the second player character, wherein the first player character and the second player character may be a same or a different player character.

2. The game system according to claim 1, wherein the processor is programmed to:
    when the determination processing is executed to determine whether or not each of the participating player characters acquires the specific item, set the number of the specific items that can be acquired by each of the player characters to be smaller than the number of the player characters continuously participating in the match-up game among the player characters, every time the end timing arrives; and
    control arrangement of the specific item in the game space based on the set number of specific items.

3. The game system according to claim 1, wherein the processor is programmed to, when the processor has suspended participation by the player character among the player characters possessing the specific item in the match-up game, arrange the specific item in the game space in order to be acquirable by other player character among the participating player characters.

4. The game system according to claim 1, wherein the processor is programmed to:
    change a possessed state of the player character among the player characters possessing the specific item from the possessed state to an unpossessed state where the player character does not possess the specific item, every time the determination processing is executed; and
    rearrange the specific item in the possession of the player character during the possessed state in the game space in order to be acquirable by the participating player characters.

5. The game system according to claim 1, wherein the processor is programmed to change the number of specific items capable of being acquired and possessed by each of the player characters depending on a game status.

6. The game system according to claim 1, wherein the processor is programmed to, when a given provided item is specified as the specific item from a provided item group including provided items of a plurality of types which are provided during the match-up game, change a type of the specific item from a type of the given provided item to a type of an other provided item at a given timing.

7. The game system according to claim 1, wherein the processor is programmed to change the determination criterion depending on a game status or in accordance with an instruction of the player among the plurality of players, the player using the player character satisfying a given first condition among the player characters.

8. The game system according to claim 1, wherein
the processor is programmed to grant a given privilege to the player character satisfying a given second condition among part of the player characters having satisfied the determination criterion during the given period.

9. The game system according to claim 1, wherein
the processor is programmed to suggest to the player, in each given period, a remaining time until an end timing of the given period.

10. The game system according to claim 1, wherein
the processor is programmed to execute display control for making the player among the plurality of the players who operates the player character which differs from part of the player characters having acquired and possessing the specific item aware of possession of a specific item by the operated player character.

11. The game system according to claim 1, wherein
the processor is programmed to control an end timing of the given period that repetitively arrives in accordance with a game status.

12. A method of executing a match-up game among a plurality of players using player characters set in a game space and providing a terminal with information related to the match-up game, wherein the game space includes a game field formed in a virtual space, and wherein the terminal of each of the players displays the match-up game in the game space, the method of providing information related to the match-up game comprising:
executing control processing related to a match-up that uses the player characters among the plurality of players;
managing a specific item, of a plurality of specific items, that is acquired by participating player characters among the player characters during the match-up game, and that is used by the participating player characters in the match-up game;
executing determination processing for repetitively determining whether or not each of the participating player characters satisfies a determination criterion related to the specific item in each given period during the match-up game;
when the processor has executed the determination processing and determined that a first player character among the participating player characters does not satisfy the determination criterion at an end timing of the given period of time, the control processing executes processing that determines to end a participation, to temporarily ban the participation, or to continue the participation while imposing a penalty, in the match-up game of the first player character;
changing a prerequisite related to the specific item in the determination processing to be disadvantageous to the player characters or changing the determination criterion to be disadvantageous to the player characters as compared to a determination criterion in previous determination processing every time the end timing arrives; and
when a state of a second player character among the participating player characters satisfies a predetermined condition by the end timing of the given period, the control processing executing processing that determines to end the participation in the match-up game of the second player character, wherein the first player character and the second player character may be a same or a different player character.

13. The method according to claim 12, further comprising
when the determination processing is executed to determine whether or not each of the participating player characters acquires the specific item, setting the number of the specific items that can be acquired by each of the player characters to be smaller than the number of the player characters continuously participating in the match-up game among the player characters, every time the end timing arrives; and
controlling arrangement of the specific item in the game space based on the set number of specific items.

14. The method according to claim 12, further comprising
when participation by the player character among the player characters possessing the specific item in the match-up game is suspended, arranging the specific item in the game space in order to be acquirable by other player character among the participating player characters.

15. The method according to claim 12, further comprising
changing a possessed state of the player character among the player characters possessing the specific item from the possessed state to an unpossessed state where the player character does not possess the specific item, every time the determination processing is executed; and
rearranging the specific item in the possession of the player character during the possessed state in the game space in order to be acquirable by the participating player characters.

16. The method according to claim 12, further comprising
changing the number of specific items capable of being acquired and possessed by each of the player characters depending on a game status.

17. The method according to claim 12, further comprising
when a given provided item is specified as the specific item from a provided item group including provided items of a plurality of types which are provided during the match-up game, changing a type of the specific item from a type of the given provided item to a type of an other provided item at a given timing.

18. The method according to claim 12, further comprising
changing the determination criterion depending on a game status or in accordance with an instruction of the player among the plurality of players, the player using the player character satisfying a given first condition among the player characters.

19. The method according to claim 12, further comprising
granting a given privilege to the player character satisfying a given second condition among part of the player characters having satisfied the determination criterion during the given period.

20. The method according to claim 12, further comprising
suggesting to the player, in each given period, a remaining time until an end timing of the given period.

* * * * *